United States Patent
Hemmer

(10) Patent No.: US 10,891,758 B2
(45) Date of Patent: Jan. 12, 2021

(54) GEOMETRY ENCODER

(71) Applicant: GOOGLE LLC, Mountain View, CA (US)

(72) Inventor: Michael Hemmer, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 121 days.

(21) Appl. No.: 16/042,738

(22) Filed: Jul. 23, 2018

(65) Prior Publication Data

US 2020/0027246 A1    Jan. 23, 2020

(51) Int. Cl.
| | | |
|---|---|---|
| *G05B 13/00* | (2006.01) | |
| *G06T 9/00* | (2006.01) | |
| *G06T 9/20* | (2006.01) | |
| *G06K 9/62* | (2006.01) | |
| *G06F 17/18* | (2006.01) | |
| *G06N 20/00* | (2019.01) | |

(52) U.S. Cl.
CPC .............. *G06T 9/001* (2013.01); *G06F 17/18* (2013.01); *G06K 9/6267* (2013.01); *G06N 20/00* (2019.01); *G06T 9/002* (2013.01)

(58) Field of Classification Search
USPC ........ 382/128–159, 166, 173–205, 224–229, 382/232–254
See application file for complete search history.

(56) References Cited

U.S. PATENT DOCUMENTS

| | | | |
|---|---|---|---|
| 6,088,035 | A  | 7/2000  | Sudarsky et al. |
| 6,167,159 | A  | 12/2000 | Touma et al. |
| 6,532,012 | B2 | 3/2003  | Deering et al. |
| 6,563,500 | B1 | 5/2003  | Seo et al. |
| 6,879,324 | B1 | 4/2005  | Hoppe et al. |
| 7,103,211 | B1 | 9/2006  | Medioni et al. |
| 7,280,109 | B2 | 10/2007 | Hoppe et al. |
| 7,283,134 | B2 | 10/2007 | Hoppe et al. |

(Continued)

FOREIGN PATENT DOCUMENTS

| | | |
|---|---|---|
| CN | 102467753 B | 10/2013 |
| CN | 102682103 B | 3/2014 |

(Continued)

OTHER PUBLICATIONS

"Entropy encoding", Wikipedia, the free encyclopedia, retrieved from https://en.wikipedia.org/wiki/Entropy_encoding, Apr. 11, 2016, 1 page.

(Continued)

*Primary Examiner* — Marcellus J Augustin
(74) *Attorney, Agent, or Firm* — Brake Hughes Bellermann LLP

(57) ABSTRACT

A method includes receiving geometric data to be encoded, generating a signature for the geometric data based on the at least one property associated with the geometric data, enumerating a set of first options, enumerating a set of second options, encoding the geometric data using the enumerated first option and the enumerated second option, decoding the encoded geometric data, selecting one of the enumerated second options based on a cost function, and training a classifier based on the signature, the enumerated first option and the selected second option.

20 Claims, 11 Drawing Sheets

(56) References Cited

U.S. PATENT DOCUMENTS

| | | | |
|---|---|---|---|
| 7,804,498 | B1 | 9/2010 | Graham et al. |
| 8,022,951 | B2 | 9/2011 | Zhirkov et al. |
| 8,217,941 | B2 | 7/2012 | Park et al. |
| 8,390,622 | B2 | 3/2013 | Park et al. |
| 8,396,293 | B1 | 3/2013 | Korah et al. |
| 8,660,376 | B2 | 2/2014 | Ahn et al. |
| 8,736,603 | B2 | 5/2014 | Curington et al. |
| 8,805,097 | B2 | 8/2014 | Lee et al. |
| 8,811,758 | B2 | 8/2014 | Leed et al. |
| 8,884,953 | B2 | 11/2014 | Teng et al. |
| 8,949,092 | B2 | 2/2015 | Chen et al. |
| 9,064,311 | B2 | 6/2015 | Mammou et al. |
| 9,111,333 | B2 | 8/2015 | Jiang |
| 9,171,383 | B2 | 10/2015 | Lee et al. |
| 9,286,538 | B1 | 3/2016 | Chen et al. |
| 9,348,860 | B2 | 5/2016 | Cai et al. |
| 9,396,512 | B2 | 7/2016 | Karras |
| 9,424,663 | B2 | 8/2016 | Ahn et al. |
| 10,176,809 | B1 | 1/2019 | Piérard |
| 10,318,891 | B1* | 6/2019 | Hemmer ............... G06T 9/00 |
| 2003/0011492 | A1* | 1/2003 | Owen ............... G08G 1/015 340/941 |
| 2004/0165767 | A1 | 8/2004 | Gokturk et al. |
| 2004/0208382 | A1 | 10/2004 | Gioia et al. |
| 2011/0010400 | A1 | 1/2011 | Hayes et al. |
| 2011/0285708 | A1* | 11/2011 | Chen ............... G06T 9/001 345/420 |
| 2013/0268862 | A1 | 10/2013 | Glaser et al. |
| 2013/0297574 | A1 | 11/2013 | Thiyanaratnam |
| 2013/0335406 | A1 | 12/2013 | Tabellion |
| 2014/0168360 | A1 | 6/2014 | Ahn et al. |
| 2014/0303944 | A1 | 10/2014 | Jiang et al. |
| 2015/0003723 | A1* | 1/2015 | Huang ............... G06K 9/6269 382/154 |
| 2015/0172717 | A1 | 6/2015 | Zhao et al. |
| 2016/0086353 | A1 | 3/2016 | Zalik et al. |
| 2016/0242690 | A1* | 8/2016 | Principe ............ A61B 5/04012 |
| 2016/0275719 | A1 | 9/2016 | Oke |
| 2017/0076438 | A1* | 3/2017 | Kottenstette ........... G06K 9/627 |
| 2017/0124454 | A1 | 5/2017 | Vasudevan et al. |
| 2017/0300777 | A1 | 10/2017 | Zhu et al. |
| 2017/0300794 | A1 | 10/2017 | Liston et al. |
| 2017/0347100 | A1 | 11/2017 | Chou et al. |
| 2017/0347122 | A1 | 11/2017 | Chou et al. |
| 2018/0053324 | A1 | 2/2018 | Cohen et al. |
| 2018/0120813 | A1* | 5/2018 | Coffman ............ G05B 19/4097 |
| 2018/0137224 | A1 | 5/2018 | Hemmer et al. |
| 2018/0199066 | A1 | 7/2018 | Ross |
| 2018/0367161 | A1 | 12/2018 | Ki et al. |
| 2019/0026555 | A1 | 1/2019 | Cabral et al. |

FOREIGN PATENT DOCUMENTS

| | | |
|---|---|---|
| KR | 1019990085657 A | 12/1999 |
| KR | 1020010008944 A | 2/2001 |
| KR | 1020030071019 A | 9/2003 |
| KR | 100420006 B1 | 2/2004 |
| KR | 1020040096209 A | 11/2004 |
| KR | 1020050006322 A | 1/2005 |
| KR | 1020050006323 A | 1/2005 |
| KR | 1020060087631 A | 8/2006 |
| KR | 1020060087647 A | 8/2006 |
| KR | 1020060087662 A | 8/2006 |
| KR | 1020060088136 A | 8/2006 |
| KR | 1020080066216 A | 7/2008 |
| KR | 1020090025672 A | 3/2009 |
| KR | 1020090097057 A | 9/2009 |
| KR | 100927601 B1 | 11/2009 |
| KR | 1020100007685 A | 1/2010 |
| KR | 20100012724 A | 2/2010 |
| KR | 20100112848 A | 10/2010 |
| WO | 0045237 A2 | 8/2000 |

OTHER PUBLICATIONS

"Quantization", Wikipedia, the free encyclopedia, retrieved from https://en.wikipedia.org/wiki/Quantization, Apr. 11, 2016, 1 page.

Alliez, et al., "Progressive compression for lossless transmission of triangle meshes", Proceedings of the 28th annual conference on Computer graphics and interactive techniques, 2001, 8 pages.

Gandoin, et al., "Progressive lossless compression of arbitrary simplicial complexes", ACM Transactions on Graphics (TOG), Jul. 23, 2002, pp. 372-379.

Gumhold, et al., "Predictive point-cloud compression", ACM SIGGRAPH 2005 Sketches, Jul. 31, 2005, 1 page.

Kanimozhi, S., et al., "Real-Time Compression Strategy on Various Point Cloud Streams", Kanimozhi, S. et al., "Real-Time Compression Strategy on Various Point Cloud Streams", International Journal of Futuristic Science Engineering and Technology, vol. 1, No. 3, Mar. 1, 2013, pp. 245-249, XP002732921., 245-249.

Merry, et al., "Compression of dense and regular point clouds", Computer Graphics Forum, Dec. 1, 2006, pp. 709-716.

Smith, J., et al., "Progressive encoding and compression of surfaces generated from point cloud data", Smtih et al.; "Progressive encoding and compression of surfaces generated from point cloud data", Computers and Graphics, vol. 36, No. 5, Mar. 17, 2012, pp. 341-348, XP028483284.

Waschbüsch, et al., "Progressive compression of point-sampled models", Eurographics symposium on point-based graphics, Jun. 2, 2004, pp. 95-102.

Dhibi et al.; "Multi-Layer Compression Algorithm for 3D Deformed Mesh Based O Multi Library Wavelet Neural Network Architecture"; Multimedia Tools and Applications, vol. 76, No. 20, Oct. 13, 2016; pp. 20869-20887.

International Search Report & Written Opinion for Application No. PCT/US2019/036113, dated Oct. 7, 2019, 15 pages.

Piperakis et al.; "3D Polygon Mesh Compression With Multi Layer Feed Forward Neural Networks"; Journal of Systemics, Cybernetics and Informatics, vol. 1—No. 3; Jun. 1, 2003; p. 7-11.

Rumman et al.; "Geometry Compression for 3D Polygonal Models Using a Neural Network"; International Journal of Computer Applications; vol. 1—No. 29; Jan. 1, 2010; pp. 13-22.

* cited by examiner

GEOMETRY ENCODER

CROSS-REFERENCE TO RELATED APPLICATION

This application incorporates by reference in its entirety U.S. patent application Ser. No. 16/042,712, filed on Jul. 23, 2018.

FIELD

Embodiments relate to encoding geometric data.

BACKGROUND

Libraries that provide compression of geometric web content (e.g., triangular meshes) can include compression models that vary significantly in their properties. A user can select compression parameters for compression models based on their knowledge of the compression models and the properties of the geometric data. However, as the number and variety of compression models increases and the number of parameters associated with these models increases (e.g., based on the complexity of the compression model), selecting desirable compression models and corresponding parameters to achieve optimal compression results may be difficult.

SUMMARY

Example implementations describe systems and methods to machine learn, select compression techniques and encoder options for compressing geometric data (e.g., mesh data).

In a general aspect a method and a non-transitory computer-readable storage medium having stored thereon computer executable program code which, when executed on a computer system, causes the computer system to perform steps. The steps include receiving geometric data to be encoded, generating a signature for the geometric data based on the at least one property associated with the geometric data, enumerating a set of first options, enumerating a set of second options, encoding the geometric data using the enumerated first option and the enumerated second option, decoding the encoded geometric data, selecting one of the enumerated second options based on a cost function, and training a classifier based on the signature, the enumerated first option and the selected second option.

Implementations can include one or more of the following features. For example, the geometric data can be mesh data. The at least one property can include at least one of a number of vertices, a number of edges, and a number of triangles, and the signature can be based on the number of vertices, the number of edges, and the number of triangles in the mesh data. The at least one property can include a number of connected components for at least one attribute, and the signature can be based on the number of connected components for the at least one attribute in the mesh data. The at least one property can include a number of boundary edges for at least one attribute, and the signature can be based on the number of boundary edges for the at least one attribute in the mesh data.

For example, the at least one property can include an angle of a triangles corner, and the signature can be based on a statistical analysis of a histogram of the angles of triangle corners in the mesh data. The at least one property can include angles between triangles, and the signature can be based on a statistical analysis of a histogram of the angles between triangles in the mesh data. The at least one property includes vertex valences, and the signature can be based on a statistical analysis of a histogram of the vertex valences in the mesh data.

For example, enumerating the second set of options can include enumerating all of the second set of options. The first option can include a fixed option and an environmental option. The cost function can be based on a performance associated with encoding the geometric data and a performance associated with decoding the encoded geometric data.

In another general aspect a method and a non-transitory computer-readable storage medium having stored thereon computer executable program code which, when executed on a computer system, causes the computer system to perform steps. The steps include receiving geometric data to be encoded, generating a signature for the geometric data based on the at least one property associated with the geometric data, receiving a first set of options, accessing a classifier based on the signature and the first set of options, selecting a set of second options based on the classifier, and encoding the geometric data using the first set of options and the second set of options.

Implementations can include one or more of the following features. For example, the geometric data can be mesh data. The signature can be based on at least one of a number of vertices, a number of edges, and a number of triangles in the mesh data, and accessing the classifier can use a trained machine learning model based on one of a random forest model, a neural network model and a cluster analysis model. The signature can be based on a number of connected components for at least one attribute in the mesh data, and accessing the classifier can use a trained machine learning model based on one of a random forest model, a neural network model and a cluster analysis model. The signature can be based on a number of boundary edges for at least one attribute in the mesh data, and accessing the classifier can use a trained machine learning model based on one of a random forest model, a neural network model and a cluster analysis model. The signature can be based on a histogram of an angle of a triangles corner in the mesh data, and accessing the classifier can use a trained machine learning model based on one of a random forest model, a neural network model and a cluster analysis model.

For example, the signature can be based on a histogram of angles between triangles in the mesh data, and accessing the classifier can use a trained machine learning model based on one of a random forest model, a neural network model and a cluster analysis model. The signature can be based on a histogram of vertex valences in the mesh data, and accessing the classifier can use a trained machine learning model based on one of a random forest model, a neural network model and a cluster analysis model. The first set of options can include a fixed option and an environmental option. The selecting of the second option can be based on the fixed option and the environmental option, and the encoding of the geometric data can use the fixed option.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the example embodiments and wherein.

Figure 1:
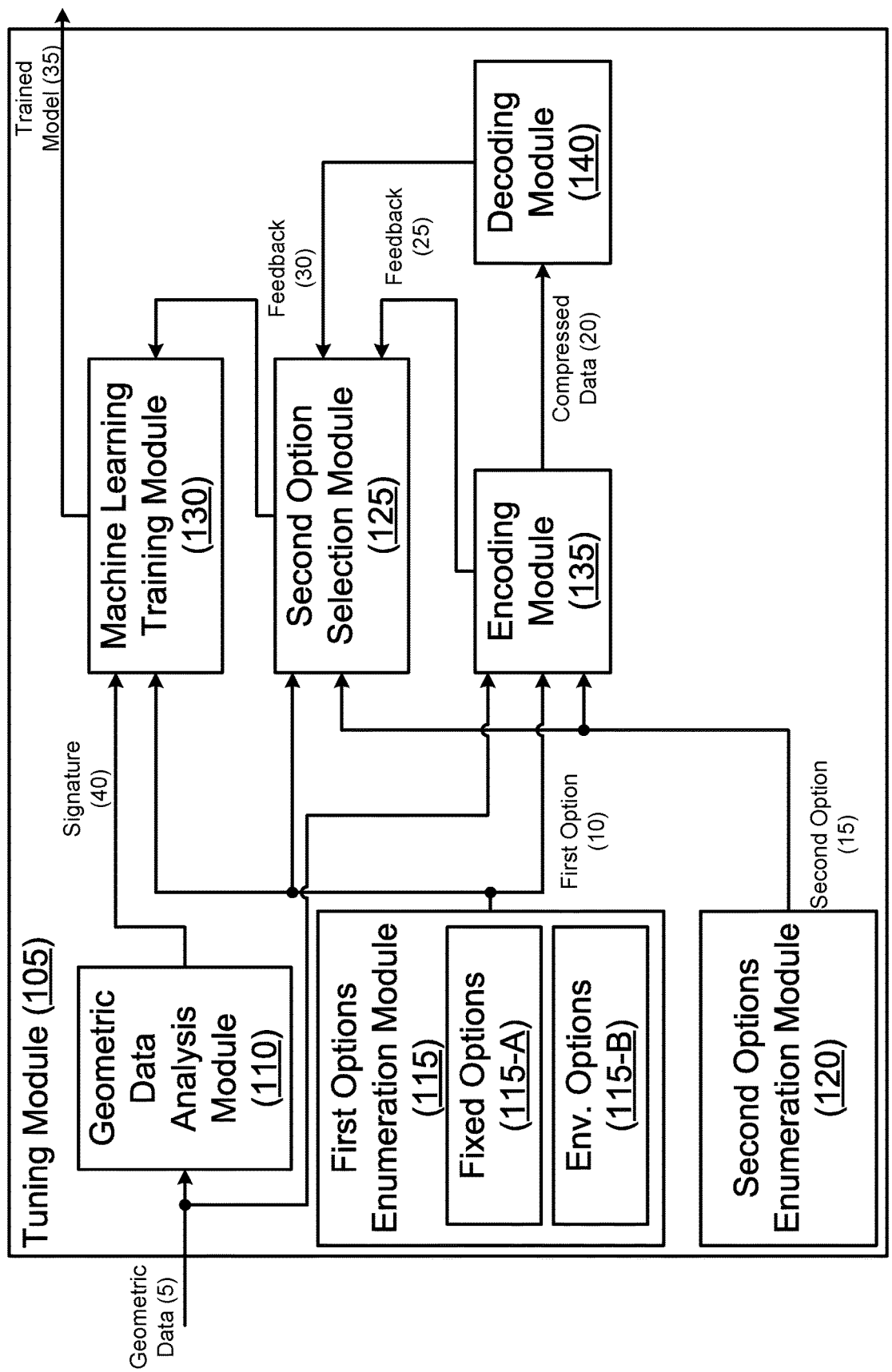
FIG. 1 illustrates a block diagram of a tuning module according to at least one example embodiment.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Geometric data can include data having varying properties. For example, game characters or virtual reality (VR) models can have few, usually textured, triangles. A scan (e.g., a reconstruction algorithm) can have a large number of regular shaped triangles. Computer aided drawing (CAD) applications can generate data that has sharp edges with degenerated triangles because these models represent mechanical parts. New techniques for compressing these and other types of geometric data are continually being developed. Documenting proper guidelines for users to use these compression techniques and generating a stable application programming interface (API) for these compression techniques has become increasingly difficult.

Example embodiments include an encoder that can select the likely best compression technique for geometric data to be compressed by the encoder. As discussed above, models used for compressing can include a plurality of parameters based on the complexity of the model. Accordingly, in addition to selecting the likely best compression technique, example embodiments can divide the parameters into a first set of parameters and a second set of parameters. The first set of parameters can be further divided into parameters that can be selected by a user and parameters that are determined by the encoding and/or decoding environment (e.g., processor speed, memory, available bandwidth, and/or the like). The first set of parameters can be minimal in number and/or not computationally complex. As a result, users may select a small number of parameters associated with typical compression targets (e.g., a number of quantization bits) and not require extensive knowledge of the model(s) used to compress the geometric data.

The first set of parameters can be included in at least one fixed option (or set of fixed options) that can be selected by a user, selected based on an encoding standard, selected using a default setting for an encoder and/or the like. The first set of parameters can be included in at least one environmental option (or set of environmental options) that can be selected based on system capabilities (e.g., processing, memory, available bandwidth, and/or the like). The fixed option and the environmental option together can be referred to as a first option (or set of first options). Accordingly, the first option can include the first set of parameters. For example, the first option can include an encoding speed (e.g., a value between 1-10), a decoding speed (e.g., a value between 0-10), a number of quantization bits, and/or the like.

The encoder can determine the second set of parameters (or remaining parameters) to use for encoding the geometric data using a trained machine learning model, a machine learning technique, machine learning algorithm, and/or a variant thereof. The second set of parameters can be selected as an encoding option (henceforth referred to as a second option or second set of options) that is most likely to include the best second set of parameters for encoding the geometric data. Accordingly, the second option includes the second set of parameters. The second option can be selected based on the geometric data (e.g., mesh data) to be compressed. The second option can be based on properties (e.g., a number of vertices, edges, and/or triangles) of the geometric data. The second option can include a large number of parameters (as compared to the first option) and/or be based on a computationally complex encoding model. The second option can change with different implementations of the encoder. By using machine learning to select the second option, the user does not require any knowledge of which models could be used to encode the geometric data and what parameters should be configured for each model.

In a first phase, a trained model including the second option is tuned, built and/or configured. Although FIG. 1 is described with regard to a single input of geometric data, the model is trained using a plurality of (e.g., 100's, 1000's, 10000's and/or more) geometric data inputs. FIG. 1 illustrates a block diagram of a tuning module 105 according to at least one example embodiment. As shown in FIG. 1, the tuning module 105 includes a geometric data analysis module 110, a first options enumeration module 115, a second options enumeration module 120, a second option selection module 125, a machine learning training module 130, an encoding module 135 and a decoding module 140. The tuning module 105 receives geometric data 5 (e.g., mesh data) as input for compressing. The tuning module 105 generates a trained model 35 as an output.

The first options enumeration module 115 includes fixed options 115-A and environmental options 115-B. The fixed options 115-A can be an encoder input and can be selected by a user, selected based on an encoding standard, selected using a default setting for an encoder and/or the like. The environmental options 115-B can be an encoding speed, encoder memory, a decoding speed, decoder memory, bandwidth and/or the like.

The geometric data analysis module 110 can be configured to use the geometric data 5 as input and determine at least one property of the geometric data 5. The at least one property can include, for example, a number of vertices, edges, and/or triangles, a number of connected components for an attribute (e.g., normal, color, texture, vertex position, surface normal vector, and/or texture coordinates), a number of boundary edges for an attribute, a histogram of angles of triangle corners, a histogram of angles between triangles, a histogram of vertex valences and the like. Therefore, the geometric data analysis module 110 can be configured to determine a number of triangles included in the geometric data 5.

The geometric data analysis module 110 can generate a signature 40. The signature 40 can be based on the at least one property of the geometric data 5 and/or a statistical analysis of the at least one property of the geometric data 5. The signature 40 can be unique for the geometric data 5. In other words, geometric data 5 having different characteristics or properties should not generate the same signature 40. For example, the at least one property can include a number of vertices, a number of edges, and a number of triangles, the at least one property can include a number of connected components for each property, and the at least one property can include a number of boundary edges for each property. In this case, the signature can be based on the a number of vertices, the number of edges, and the number of triangles, a number of connected components for each property, and/or a number of boundary edges for each property. For example, the at least one property can include angles of triangle corners, angles between triangles, and/or vertex valences. In this case, the signature can be based on a statistical analysis of a histogram of the angles of triangle corners, a histogram of the angles between triangles, and/or a histogram of the vertex valences.

In one implementation, the geometric data analysis module 110 can be configured to determine a number of triangles and an angle associated with each of the vertices of the triangles. Then the geometric data analysis module 110 can segment the angle data. For example, the geometric data analysis module 110 can be configured to define a histogram based on the angle associated with each of the vertices of the triangles. Each bar of the histogram can be associated with an angle or range of angles. The geometric data analysis module 110 can generate the signature 40 based on the histogram. For example, the signature 40 can have a length (e.g., number of variables) equal to the number of bars in the histogram. A unique signature 40 for the geometric data 5 can have a plurality of variable values corresponding to a value associated with each of the bars in the histogram.

The first options enumeration module 115 can be configured to iteratively change all, substantially all, and/or a portion of at least one variable value for a first set of parameters that define a first option 10. In example implementations, the first option can be a set of options including at least one fixed option 115-A and at least one environmental option 115-B. In example implementations, a first option includes a unique combination of the first set of parameters and values assigned to the first set of parameters. The parameters can be associated with the fixed options 115-A and the environmental options 115-B. The second options enumeration module 120 can be configured to iteratively change all, substantially all, and/or a portion of at least one variable value for a second set of parameters defining a second option 15. In example implementations, a second option includes a unique combination of the second set of parameters and values assigned to the second set of parameters.

In an example implementation, one of the at least one variable value for the first option 10 (e.g., a parameter associated with the fixed options 115-A or the environmental options 115-B) is changed by the first options enumeration module 115, then all, substantially all, and/or a portion of at least one variable value for the second option 15 is changed by the second option enumeration module 120. During each iteration, the encoding module 135 compresses the geometric data 5, the decoding module 140 decompresses the compressed data 20 and the second option selection module 125 stores the current iteration of the second option 15 as an option for encoding the geometric data 5.

The second option selection module 125 can be configured to select a second option 15 for encoding the geometric data 5. For example, the selected second option can include values associated with the at least one variable value for the second set of parameters corresponding to the second option 15. The optimized or best second option 15 for encoding the geometric data 5 can be selected using a cost function. In some implementations, the cost function can be based on minimizing an algorithm based on the environmental options 115-B included in the first option 10. In an example implementation, the algorithm can be based on a fastest encode time (e.g., smallest elapsed time), fastest decode time (e.g., smallest elapsed time) and/or a size of the compressed data 20. These factors can be weighted based on the environmental options 115-B included in the first option 10.

In some implementations, the second option selection module 125 can be configured to receive feedback 25 (e.g., data, statistics, training data, and the like) associated with a performance of the compression from the encoding module 130. In some implementations, the second option selection module 125 can be configured to receive feedback 30 (e.g., data, statistics, training data, and the like) associated with a performance of the decompression from the decoding module 140. Feedback 25, 30 can be based on the performance of the compression and/or decompression. For example, a performance of the compression can include an elapsed time (e.g., encoding speed) that the encoding module 135 used to encode the geometric data 5. The elapsed time can be communicated to the second option selection module 125 as feedback 25. The second option selection module 125 can then use the elapsed time in the cost function to determine if the second option 15 is optimized (e.g., fastest) for the geometric data 5.

The machine learning training module 130 can be configured to generate (or train, modify and the like) a trained model 35, including a plurality of classifiers, based on the signature 40, the first option 10, and the selected second option 15. In an example implementation, the second option selection module 125 selects a second option 15 and communicates the second option 15 to the machine learning training module 130 after enumerating through a plurality of second options 15 for a constant first option 10. The selected second option 15 is communicated to the machine learning training module 130 as the optimized or best second option 15 for encoding the geometric data 5. The machine learning training module 130 generates a classifier including the signature 40, the first option 10 and the second option 15. Generating the trained model 35 can include initiating the trained model 35 with the classifier, can include adding the trained classifier to an existing trained model 35 and/or training or updating (e.g., changing the best or optimal second option 15) in a classifier that exists in the trained model 35.

The signature 40 and first option 10 can be used to access the classifier in the trained model 35 in order to select the second option 15 in a future encoding process. The future encoding process can use a machine learning model to select the second option 15. The machine learning model can include one or more of a random forest model, a random decision forest model, a neural network model, an artificial neural network model, a cluster analysis model and/or the like. For example, a random forest model can be used to rank the importance of data in a regression. As discussed above, the model can be trained using a plurality of (e.g., 100's, 1000's, 10000's and/or more) geometric data 5 inputs. Therefore, the machine learning training module 130 can store the results of tuning the plurality of geometric data 5 inputs. Then, the machine learning training module 130 can be configured to organize the data (e.g., the plurality of classifiers, combinations of the signature 40, the first option 10, and the second option 15, and the like) in accordance with the machine learning model.

For example, the data can be organized based on the cluster analysis model. Therefore, clusters can be determined based on, for example, the signature 40 of each of the plurality of classifiers. In other words, the clusters can be determined based on the characteristics of the geometric data 5 (e.g., based on characteristics of a mesh). Alternatively (or in addition to), clusters can be determined based on the signature 40 and the first option 10 of each of the plurality of classifiers. Then each cluster can have an associated second option 15.

For example, the data can be organized based on the neural network (and/or artificial neural network) model. Therefore, a layered neural network can be generated using a plurality of neurons. Each neuron can be determined based on, for example, the signature 40 of each of the plurality of classifiers. Alternatively (or in addition to), neurons can be determined based on the signature 40 and the first option 10 of each of the plurality of classifiers. The neurons in adjacent layers can be interconnected. Each neuron (e.g., classifier) can also have an associated second option 15.

For example, the data can be organized based on the random forest (and/or random decision forest) model. Therefore, a network of nodes can be generated in a root/leaf structure. Each node and the edges between nodes can be determined based on, for example, the signature 40 of each of the plurality of classifiers. Alternatively (or in addition to), nodes and edges can be determined based on the signature 40 and the first option 10 of each of the plurality of classifiers. Each node (e.g., classifier) can also have an associated second option 15.

Accordingly, trained model 35 can include a plurality of clusters, neurons or nodes (e.g., representing each of the plurality of classifiers) based on the machine leaning model. Further, the trained model 35 can be trained based on a plurality of (e.g., 100's, 1000's, 10000's and/or more) geometric data 5 inputs used to define the clusters, neurons or nodes. Accordingly, training the trained model 35 using plurality of (e.g., 100's, 1000's, 10000's and/or more) geometric data 5 inputs can include initiating the trained model 35 with a classifier generated with a first of the plurality of geometric data 5 inputs, can include adding the trained classifier to an existing trained model 35 and/or training or updating (e.g., changing the best or optimal second option 15) in a classifier that exists in the trained model 35.

In an example implementation, the encoding module 135 can use an encoding technique that includes at least vertex ordering, data prediction and entropy coding. Vertex ordering can arrange the list of vertices into a certain structure so that the local relationship among vertices can be described. The vertex ordering can be based on the model and use the second option 15 as variable input. Data prediction can utilize the structure to produce a sequence of residuals by removing any redundancy in the geometric data. The data prediction can be based on the model and use the second option 15 as variable input. Entropy coding can include quantizing and coding the residuals based on a rate-distortion performance requirement. The entropy coding can be based on the model and use of the first option 10 and the second option 15 as variable inputs. For example, the second option 15 can have at least one variable value associated with the second set of parameters used in entropy encoding. The decoding module 140 can decompress the compressed data 20 using a decoding technique configured to perform the inverse of the encoding technique described above.

Figure 2:
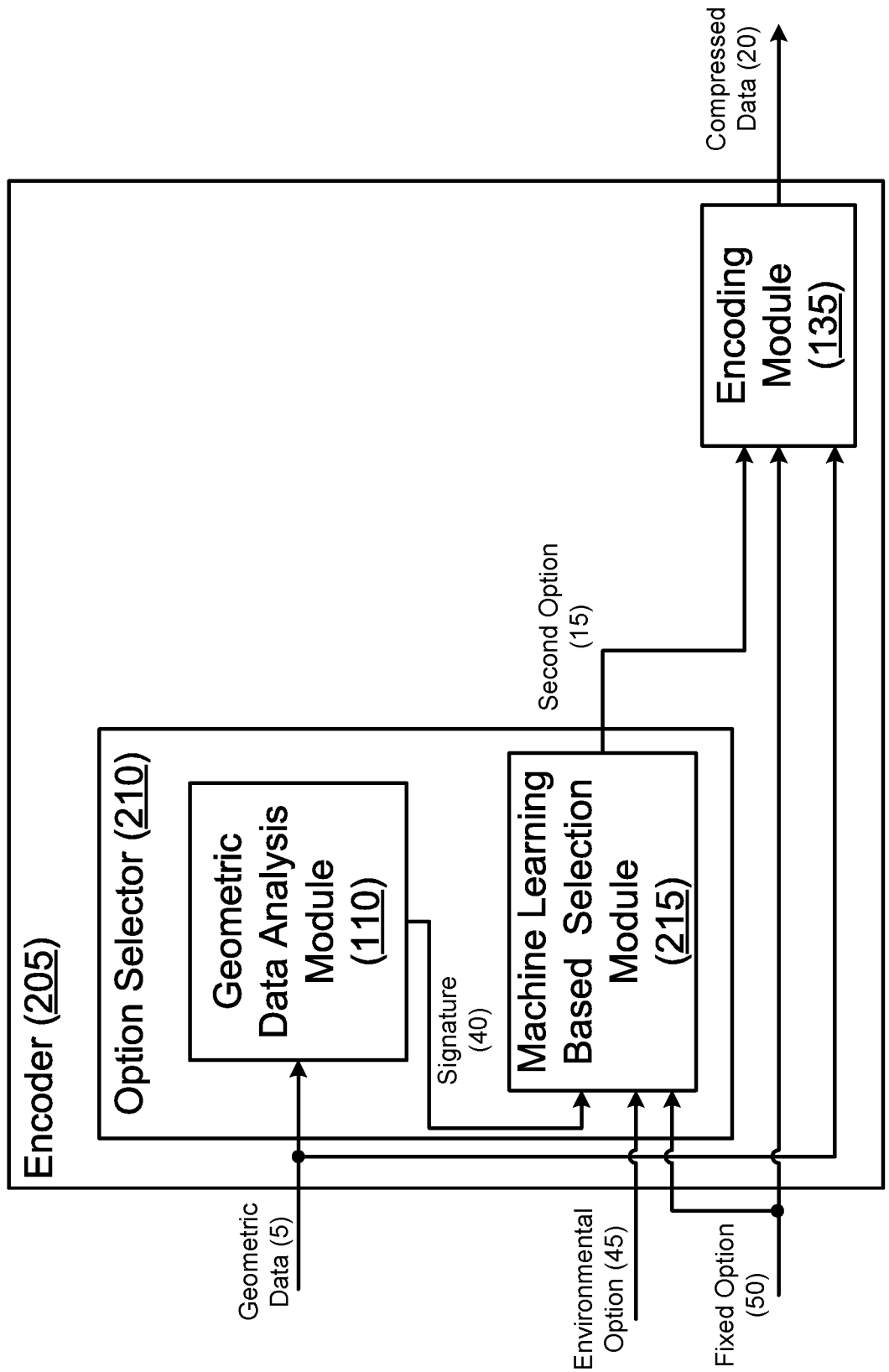
FIG. 2 illustrates a block diagram of an encoder according to at least one example embodiment.

In a second phase the configured options including the second option 15 are selected for use in an encoding process. FIG. 2 illustrates a block diagram of an encoder 205 according to at least one example embodiment. As shown in FIG. 2, the encoder 205 includes an option selector 210 and the encoder module 135. The option selector 210 includes the geometric data analysis module 110 and a machine learning based selection module 215. The geometric data analysis module 110 can generate a signature 40. The signature 40 can be based on a statistical analysis of the at least one property of the geometric data 5. The encoder 205 receives geometric data 5 (e.g., mesh data) as input for compressing, environmental options 45 and fixed options 50. The encoder 205 generates compressed data 20 as an output. The option selector 210 can be configured to select a second option 15 for use by the encoding module 135 to encode the geometric data 5. The option selector 210 can be configured to select a second option 15 based on the geometric data 5, the environmental option 45, the fixed option 50 and/or a combination of the geometric data 5, the environmental option 45 and the fixed option 50.

The machine learning based selection module 215 can be configured to select the best second option 15 for compressing the geometric data 5 based on the signature 40, the environmental option 45 and the fixed option 50. The machine learning based selection module 215 can include a trained model 35 that is generated as described above. In an example implementation, a classifier of the trained model 35 can be accessed based on the signature 40, the environmental option 45 and/or the fixed option 50 and a second option 15 (or set of second options) can be selected based on the classifier. Accessing the classifier can include using a trained machine learning model based on one of a random forest model, a neural network model and a cluster analysis model to search for the classifier amongst the plurality of classifiers included in the trained model.

The trained model 35 can be based on a machine learning model including one or more of a random forest model; a random decision forest model, a neural network model, an artificial neural network model, a cluster analysis model and/or the like. The machine learning based selection module 215 can be configured to access a classifier of the trained model using the signature 40, the environmental option 45 and/or the fixed option 50 as input for an algorithm based on the machine learning model. The machine learning based selection module 215 then outputs the selected second option 15.

In some implementations, the second option (or set of second options) associated with the classifier can be a reference or pointer to the second option. Therefore, the machine learning based selection module 215 can be configured to use the reference or pointer (e.g., as a key or index) to select the second option (or set of second options) from a storage location (e.g., a table, a file, an XML file, a remote storage location and the like). The encoding module 135 then compresses the geometric data 5 using the fixed option 50 and the second option 15.

Figure 3:
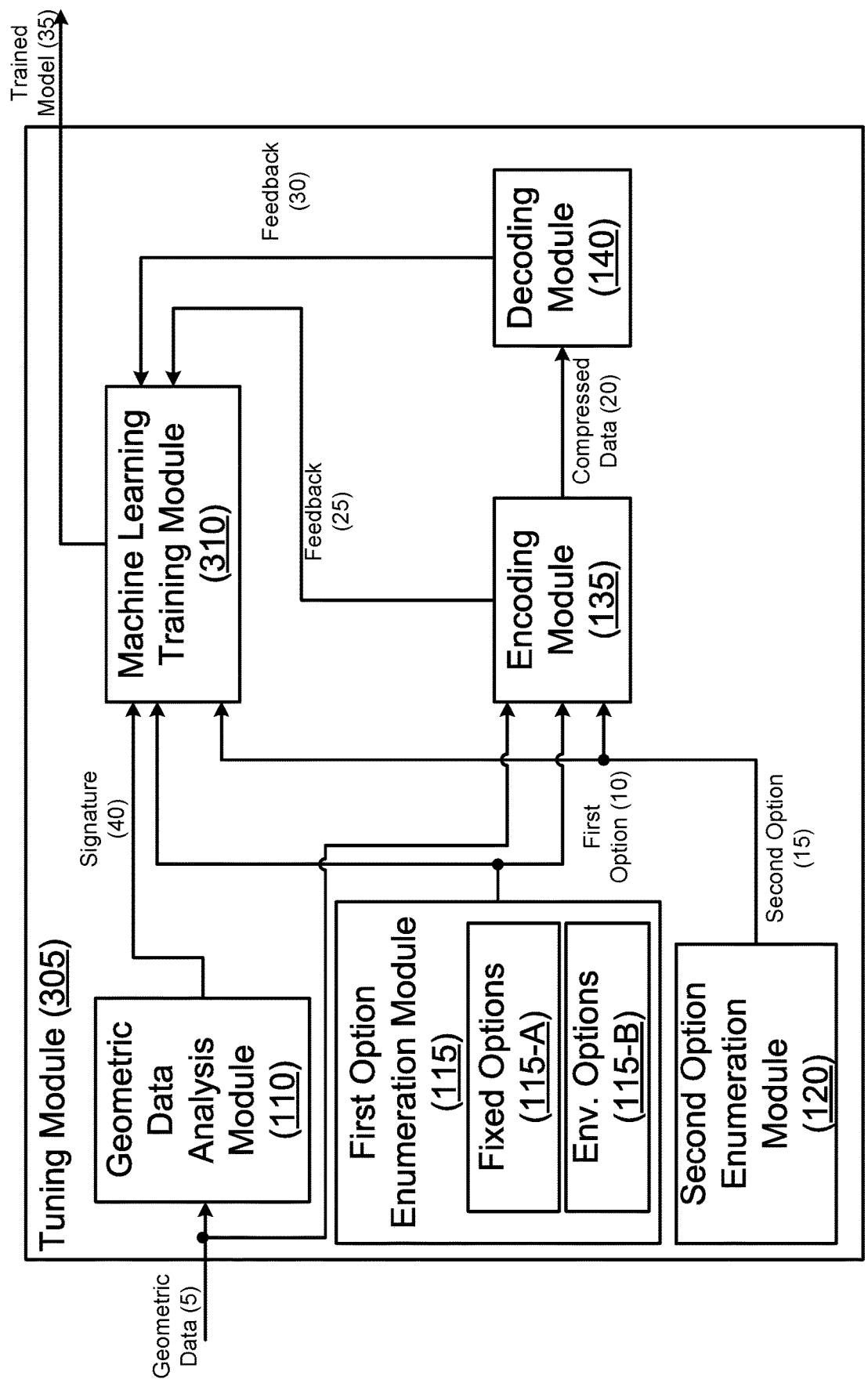
FIG. 3 illustrates a block diagram of another tuning module according to at least one example embodiment.

FIG. 3 illustrates a block diagram of another tuning module 305 according to at least one example embodiment. As mentioned above, in a first phase, the second option is tuned, built and/or configured. As shown in FIG. 3, the tuning module 305 includes the geometric data analysis module 110, the first options enumeration module 115, the second options enumeration module 120, a machine learning training module 310, the encoding module 135 and the decoding module 140. The tuning module 305 receives geometric data 5 (e.g., mesh data) as input for compressing. The tuning module 305 generates a trained model 35 as an output. The first options enumeration module 115 includes the fixed options 115-A and the environmental options 115-B.

The implementation of tuning module 305 is somewhat similar to the implementation of tuning module 105. For example, first options and second options are enumerated and the geometric data 5 is encoded based on the first option and the second option. However, in the implementation of tuning module 305 an optimal second option 15 is not selected. Instead, the trained model 35 includes feedback 25 and feedback 30.

Accordingly, the machine learning training module 310 can be configured to generate a trained model 35 based on the first option 10, the signature 40, the feedback 25 and the feedback 30. In an example implementation, the machine learning training module 130 generates the trained model 35 by using the signature 40, the first option 10, the feedback 25 and the feedback 30 to generate, train and/or modify a regressor. Generating the trained model 35 can include initiating the trained model 35 with the regressor, can include adding the trained regressor to an existing trained model 35 and/or training or updating (e.g., changing the feedback 25 and/or the feedback 30) in a regressor that exists in the trained model 35.

The feedback 25 can include data, statistics, training data, and the like associated with a performance of the compression from the encoding module 135. The feedback 30 can include data, statistics, training data, and the like associated with a performance of the decompression from the decoding module 140. Therefore, each of a plurality regressors in the trained model 35 can include performance data associated with encoding the geometric data 5 and performance data associated with decoding the geometric data 5. In an example implementation, the regressors (an in turn the trained model 35) can include an encoding speed and a memory (e.g., cache and/or compressed data) usage associated with encoding the geometric data 5 and a decoding speed and a memory usage associated with decoding the geometric data 5. Together, the feedback 25 and the feedback 30 can indicate a performance of the encoder 135 and/or the decoder 140.

This performance (or estimated performance) can be used to select the second option 15 in a future encoding process. The future encoding process can use a machine learning model to select the performance (e.g., as an estimated performance in another system). The machine learning model can include one or more of a random forest model, a random decision forest model, a neural network model, an artificial neural network model, a cluster analysis model and/or the like. For example, a random forest model can be used to rank the importance of data in a regression. As discussed above, the model can be trained using a plurality of (e.g., 100's, 1000's, 10000's and/or more) geometric data 5 inputs. Therefore, the machine learning training module 130 can store the results of tuning the plurality of geometric data 5 inputs. Then, the machine learning training module 130 can be configured to organize the data (e.g., the plurality of classifiers, combinations of the signature 40, the first option 10, and the second option 15, and the like) in accordance with the machine learning model.

For example, the data can be organized based on the cluster analysis model. Therefore, clusters can be determined based on, for example, the signature 40 of each of the plurality regressors, in other words, the clusters can be determined based on the characteristics of the geometric data 5 (e.g., based on characteristics of a mesh). Alternatively (or in addition to), clusters can be determined based on the signature 40 and the first option 10 of each of the plurality regressors. Then each cluster (e.g., including a subset of the plurality regressors) can have an associated performance.

For example, the data can be organized based on the neural network (and/or artificial neural network) model. Therefore, a layered neural network can be generated using a plurality of neurons. Each neuron can be determined based on, for example, the signature 40 of each of the plurality regressors. Alternatively (or in addition to), neurons can be determined based on the signature 40 and the first option 10 of each of the plurality regressors. The neurons (e.g., regressors) in adjacent layers can be interconnected. Each neuron can also have an associated performance.

For example, the data can be organized based on the random forest (and/or random decision forest) model. Therefore, a network of nodes can be generated in a root/leaf structure. Each node and the edges between nodes can be determined based on, for example, the signature 40 of each of the plurality regressors. Alternatively (or in addition to), nodes and edges can be determined based on the signature 40 and the first option 10 of each of the plurality regressors, Each node (e.g., regressor) can also have an associated performance.

Accordingly, the trained model 35 can include a plurality of clusters, neurons or nodes (e.g., representing each of the plurality of regressors) based on the machine leaning model. Further, the trained model 35 can be trained based on a plurality of (e.g., 100's, 1000's, 10000's and/or more) geometric data 5 inputs used to define the clusters, neurons or nodes. Accordingly, training the trained model 35 using the plurality of (e.g., 100's, 1000's, 10000's and/or more) geometric data 5 inputs can include initiating the trained model 35 with a regressors generated with a first of the plurality of geometric data 5 inputs, can include adding the trained regressors to an existing trained model 35 and/or training or updating (e.g., changing the feedback 25 and/or the feedback 30) in a classifier that exists in the trained model 35.

Figure 4:
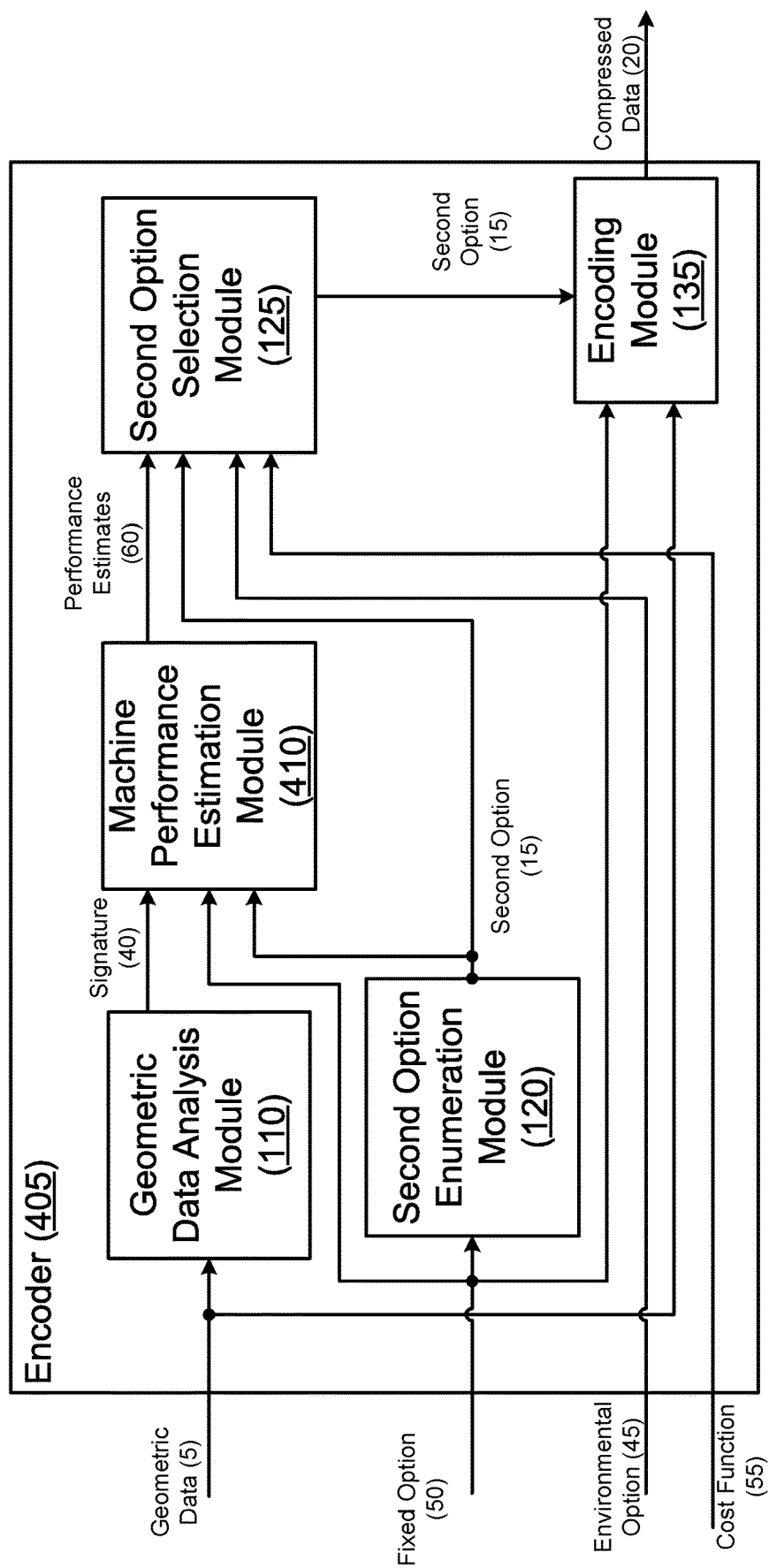
FIG. 4 illustrates a block diagram of another encoder according to at least one example embodiment.

FIG. 4 illustrates a block diagram of an encoder 405 according to at least one example embodiment. As mentioned above, in a second phase the second option is selected for use in an encoding process. As shown in FIG. 4, the encoder 405 includes the geometric data analysis module 110, the second option enumeration module 120, the machine performance estimation module 410, the second option selection module 125 and the encoder module 135. The second option enumeration module 120 enumerates through each of the possible second options 15 for the input fixed option 50.

The machine performance estimation module 410 can include the trained model 35 that is generated and/or trained as described above. For example, can include a plurality of clusters, neurons or nodes organized based on the machine leaning model and trained based on a plurality of (e.g., 100's, 1000's, 10000's and/or more) geometric data 5 inputs. The machine performance estimation module 410 can select and can communicate performance estimates 60 associated with the trained models 35 that correspond to the possible second options 15 for the input fixed option 50 based on the signature 40. In other words, the machine performance estimation module 410 selects at least one performance estimate 60 using the trained model 35 based on the signature 40 and the fixed option 50. The at least one performance estimate 60 is then communicated to the second option selection module 125.

In some implementations, the machine performance estimation module 410 can access a regressor of the trained model 35 based on the signature 40 and the fixed option 50 and the performance estimates 60 can be selected based on the regressor. Accessing the regressor can include using a trained machine learning model based on one of a random forest model, a neural network model and a cluster analysis model to search for the regressor amongst the plurality of regressors included in the trained model.

In an example implementation, the regressor includes a plurality of performance estimates and the second option can be selected from the enumerated second options (or second set of options) based on the plurality of performance estimates and a cost function. For example, the second option can be selected based on at least one performance estimate associated with a regressor, an environmental option 45 associated with the encoding module 135 and/or a cost function as described below.

The trained model 35 can be based on a machine learning model including one or more of a random forest model, a random decision forest model, a neural network model, an artificial neural network model, a cluster analysis model and/or the like. The machine performance estimation module 410 can be configured to access (e.g., search for) a regressor in the trained model 35 based on the signature 40 and/or the fixed option 50 as input to an algorithm based on the machine learning model. The algorithm uses the regressor to provide the at least one performance estimate 60 (e.g., as output of the algorithm). The machine performance estimation module 410 then provides or outputs the selected at least one performance estimate 60.

The second option selection module 125 selects the second option 15 based on the at least one performance estimate 60, the environmental option 45 and/or the cost function 55. In an example implementation, the cost function can include an algorithm that weighs bandwidth (or compressed memory usage) over encoder speed and decoder speed. In other words, minimizing the bandwidth usage can be more important than how fast geometric data is encoded or decoded. Accordingly, the cost function can include a variable including a compression rate that is selected from the performance estimates 60. The cost function can further include a variable including the encoder speed and a variable including a decoder speed each selected from the performance estimates 60 and the environmental option 45 (e.g., the performance estimate can be modified based on the environment because the trained model can be generated in a different environment than encoder 405). The second option selection module 125 can select the second option 15 having the lowest corresponding cost function.

In an example implementation, the cost function can include an algorithm that weighs encoding time over bandwidth usage. In other words, minimizing the time to compress the geometric data can be more important than how bandwidth usage or the time to decode compressed data. Accordingly, the cost function can include at least one variable associated with compression speed. For example, the at least one variable can include a performance estimate 60 associated with a trained model 35, an amount of cache available for the encoder 405 and a processor speed associated with the encoder 405 each selected from the environmental option 45. The cost function can further include a variable including a compression rate that is selected from the performance estimates 60 and a variable including a decoder speed selected from the performance estimates 60 and/or the environmental option 45 (e.g., the performance estimate can be modified based on the environment because the trained model can be generated in a different environment than encoder 405). The second option selection module 125 can select the second option 15 having the lowest corresponding cost function. The cost functions described above are exemplary. The disclosure is not limited thereto.

Figure 5:
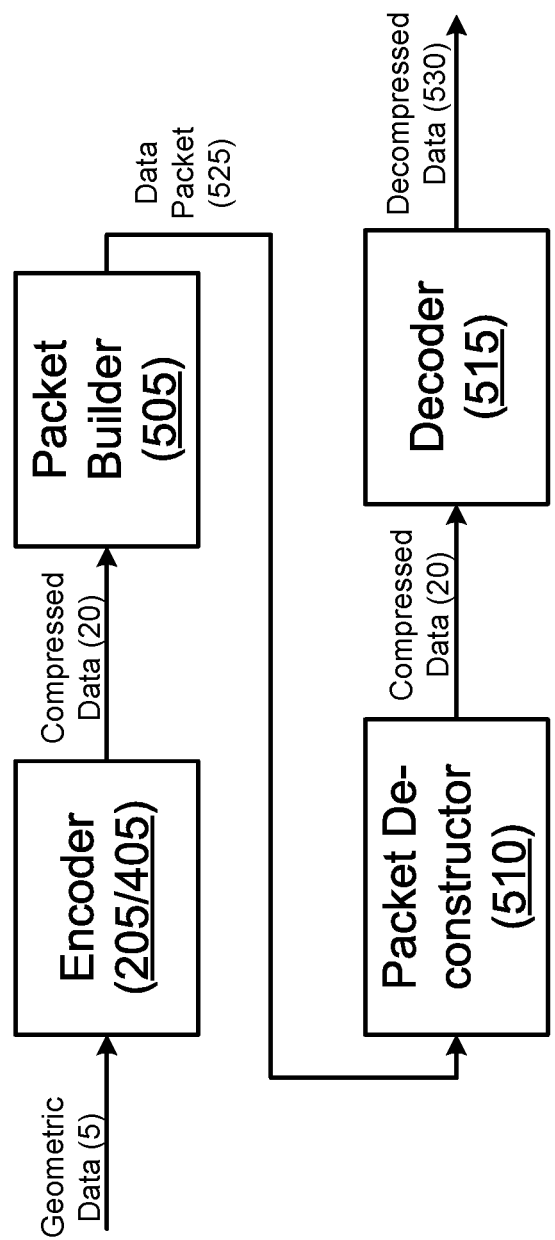
FIG. 5 is a block diagram illustrating a data flow according to an example implementation.

FIG. 5 is a block diagram illustrating a data flow according to an example implementation. As shown in FIG. 4, after the geometric data 5 is compressed by the encoder 205/405, compressed data 20 and the option used to compress the geometric data is communicated to a packet builder 505. The option used to compress the geometric data can include the parameters (e.g., the option 10 and/or the second option 15) used by the encoder 205/405 to compress the geometric data 5. The packet builder 505 defines or builds a data packet 525 including the compressed data 20 and the options. Data packet 525 is then communicated to a packet de-constructor 510. The packet de-constructor 510 separates the compressed data 20 and the options and communicates the compressed data 20 and the options to a decoder 515. The decoder 515 decompresses (output as decompressed data 530) the compressed data 20 using the options. In an example implementation, the decoder 515 does not have to be configured to determine any properties of the geometric data, because the options are communicated with the compressed data 20.

Figure 6:
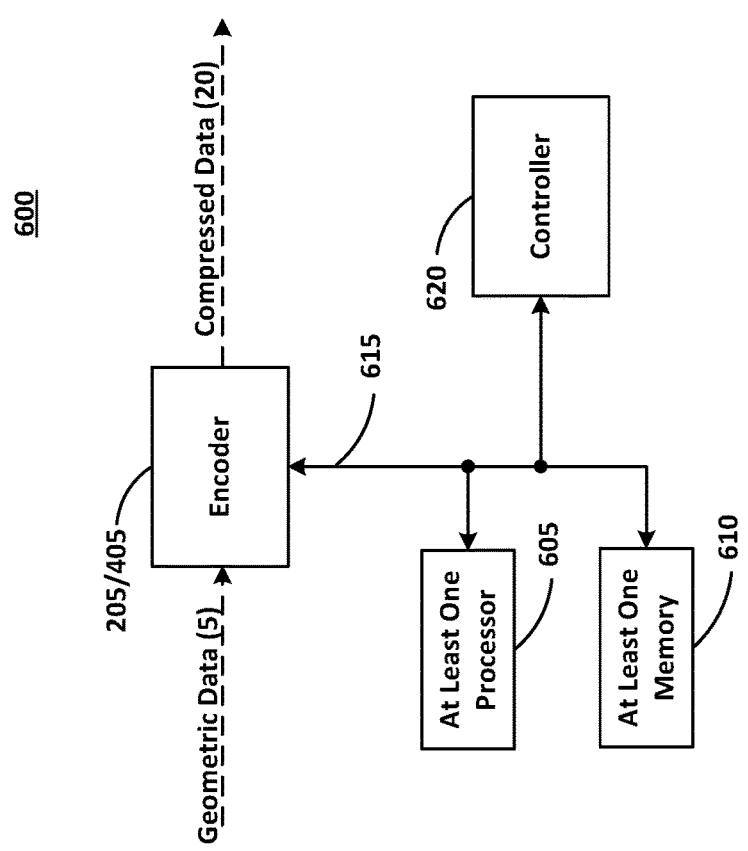
FIG. 6 illustrates an encoder system according to at least one example embodiment.

FIG. 6 illustrates the encoder system 600 according to at least one example embodiment. The encoder system 600 may be understood to include various standard components which may be utilized to implement the techniques described herein, or different or future versions thereof. As shown in FIG. 6, the encoder system 600 includes the at least one processor 605, the at least one memory 610, a controller 620, and the encoder 205. The at least one processor 605, the at least one memory 610, the controller 620, and the encoder 205 are communicatively coupled via bus 615.

The at least one processor 605 may be configured to execute computer instructions associated with the controller 620 and/or the encoder 205. The at least one processor 605 may be a shared resource. For example, the encoder system 600 may be an element of a larger system (e.g., a 2D or 3D scanner). Therefore, the at least one processor 605 may be configured to execute computer instructions associated with other elements (e.g., controller laser scanner position or movement) within the larger system.

The at least one memory 610 may be configured to store data and/or information associated with the encoder system 600. For example, the at least one memory 610 may be configured to store buffers including, for example, buffers storing geometric data, portions of the geometric data, positions of data points in the geometric data, a number of data points associated with a portion of the geometric data, and/or the like. For example, the at least one memory 610 may be configured to store models, training algorithms, parameters, datastores and the like.

The controller 620 may be configured to generate various control signals and communicate the control signals to various blocks in encoder system 600. The controller 620 may be configured to generate the control signals in accordance with the method described below. The controller 620 may be configured to control the encoder 205 to encode geometric data using a model according to example embodiments as described herein. For example, the controller 620 may generate and communicate a control signal(s) indicating a model and/or parameters associated with the model.

Figure 7:
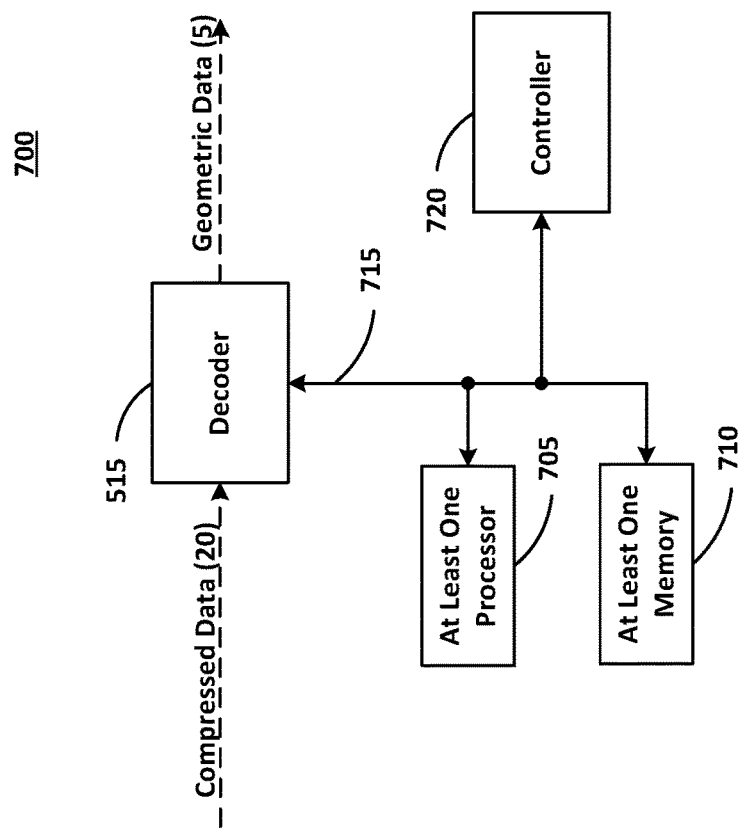
FIG. 7 illustrates a decoder system according to at least one example embodiment.

FIG. 7 illustrates a decoder system according to at least one example embodiment. In the example of FIG. 7, a decoder system 700 may be at least one computing device and should be understood to represent virtually any computing device configured to perform the methods described herein. As such, the decoder system 700 may be understood to include various standard components which may be utilized to implement the techniques described herein, or different or future versions thereof. By way of example, the decoder system 700 is illustrated as including at least one processor 705, as well as at least one memory 710 (e.g., a computer readable storage medium), a controller 720, and the decoder 515. The at least one processor 705, the at least one memory 710, the controller 720, and the decoder 515 are communicatively coupled via bus 715.

The at least one processor 705 may be utilized to execute instructions stored on the at least one memory 710 to implement the various features and functions described herein, or additional or alternative features and functions. The at least one processor 705 and the at least one memory 710 may be utilized for various other purposes. For example, the at least one memory 710 may represent an example of various types of memory and related hardware and software which might be used to implement any one of the modules described herein. According to example embodiments, the encoder system 600 and the decoder system 700 may be included in a same larger system. Further, the at least one processor 605 and the at least one processor 705 may be a same at least one processor and the at least one memory 610 and the at least one memory 710 may be a same at least one memory. Still further, the controller 620 and the controller 720 may be a same controller.

The at least one processor 705 may be configured to execute computer instructions associated with the controller 720 and/or the decoder 515. The at least one processor 605 may be a shared resource. For example, the decoder system 700 may be an element of a larger system (e.g., a mobile device). Therefore, the at least one processor 705 may be configured to execute computer instructions associated with other elements (e.g., web browsing or wireless communication) within the larger system.

The at least one memory 710 may be configured to store data and/or information associated with the decoder system 700. For example, the at least one memory 710 may be configured to store a model and parameters associated with the geometric data, and/or the like.

The controller 720 may be configured to generate various control signals and communicate the control signals to various blocks in decoder system 700. The controller 720 may be configured to generate the control signals in accordance with the methods described below. The controller 720 may be configured to control the decoder 515 to decode compressed data associated with geometric data using a model and parameters according to example embodiments as described above.

Figure 8:
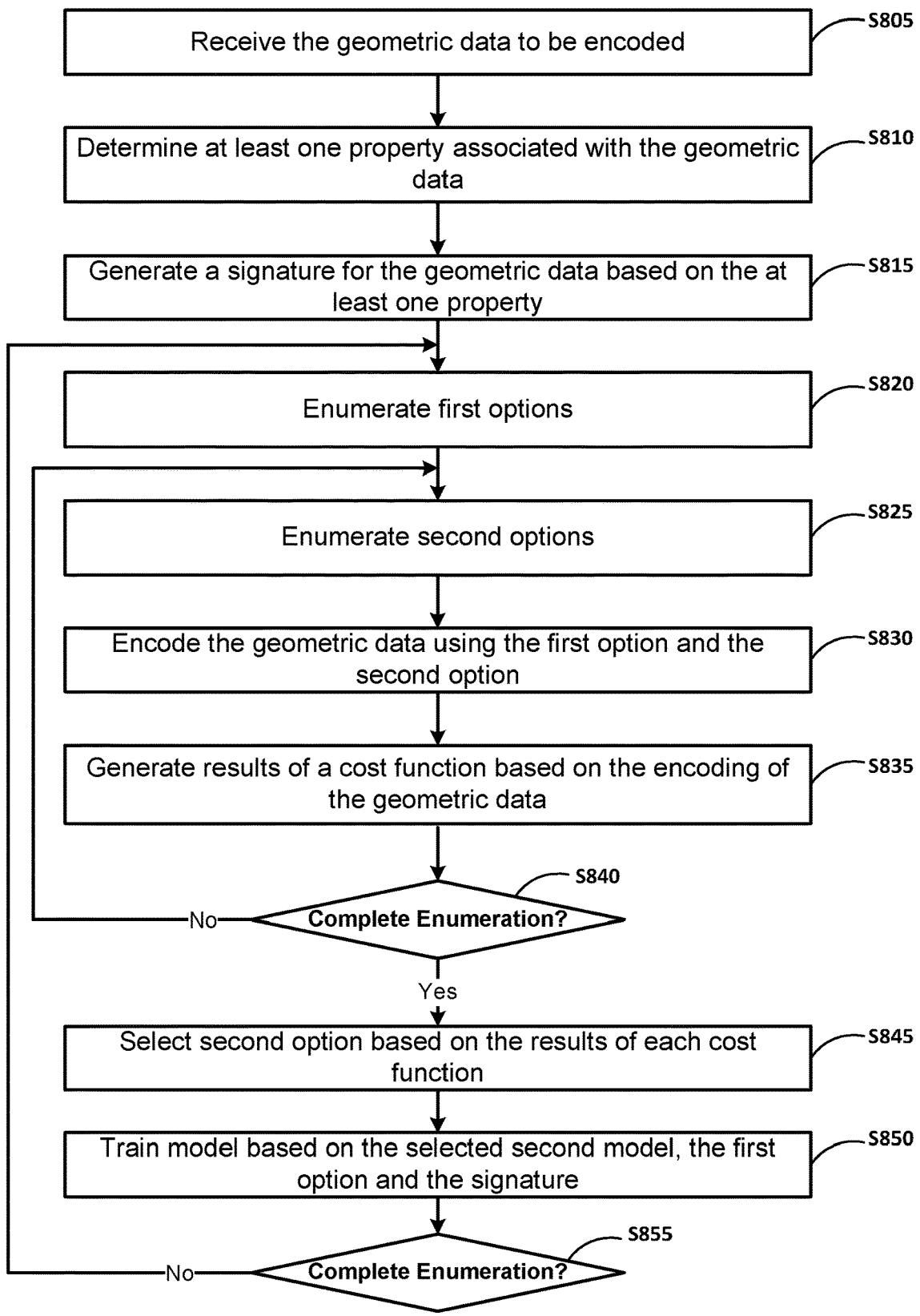
FIG. 8 illustrates a method for training a model according to at least one example embodiment.
Figure 10:
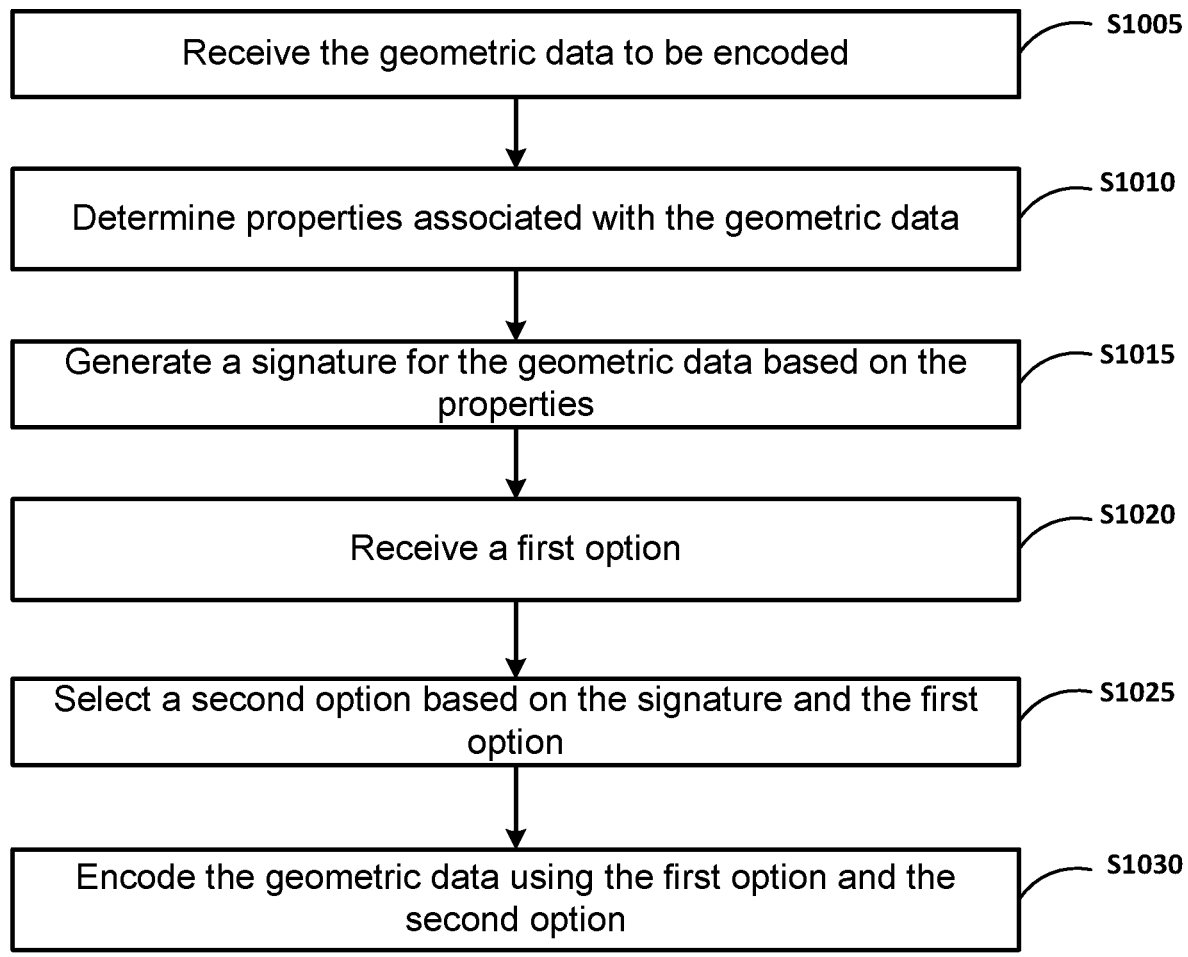
FIG. 10 illustrates a method for encoding data according to at least one example embodiment.
Figure 11:
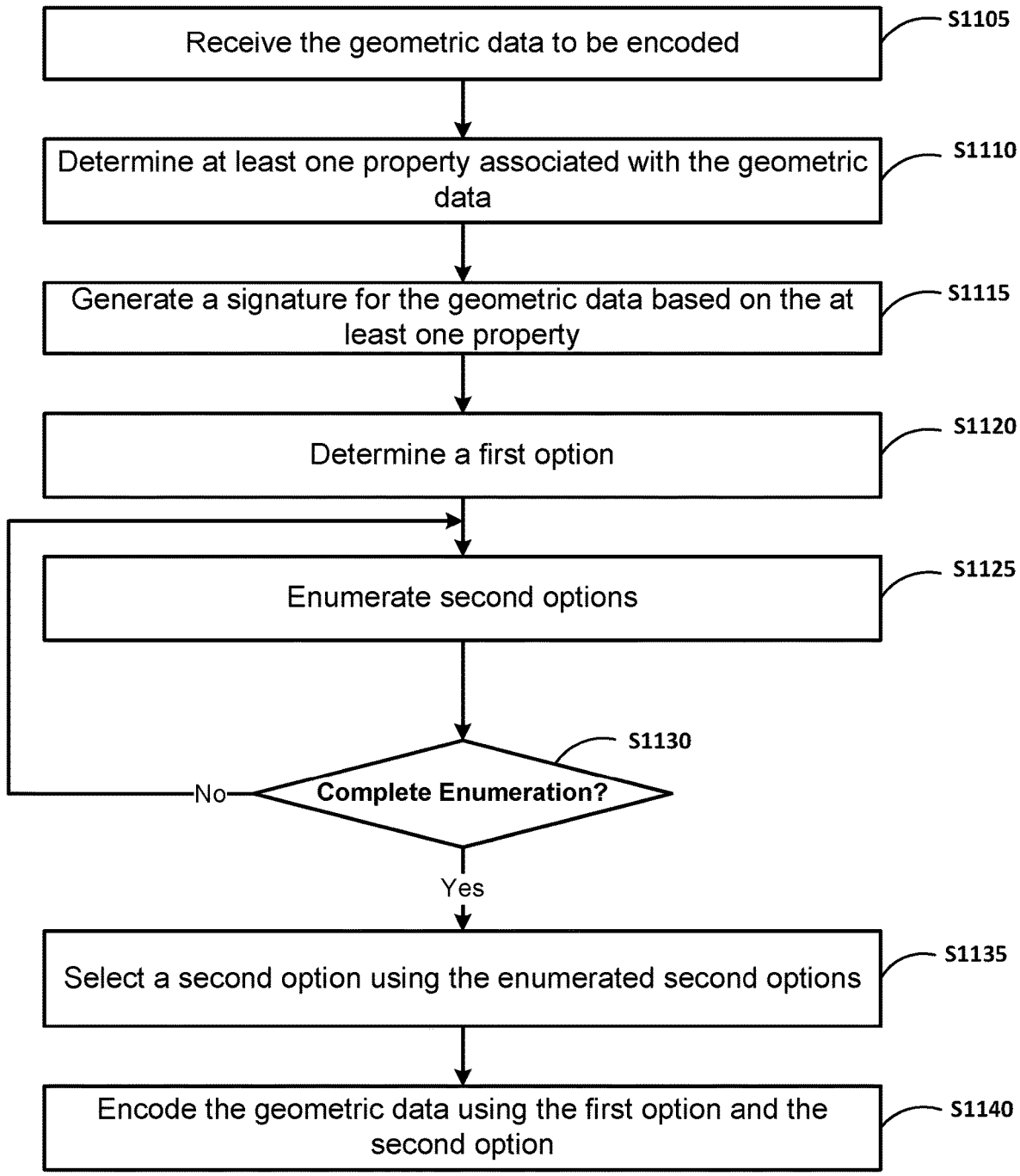
FIG. 11 illustrates another method for encoding data according to at least one example embodiment.

The method steps described with regard to FIGS. 8 and 11 may be executed as software code stored in a memory (e.g., at least one memory 610, 710) associated with an encoder and/or decoder system (e.g., as shown in FIGS. 1-6) and executed by at least one processor (e.g., processor 605, 705) associated with the encoder and/or system. For example, the memory can be a non-transitory computer-readable storage medium having storing computer executable program code which, when executed on a computer system, causes the computer system to perform steps described below with regard to FIGS. 8-11. However, alternative embodiments are contemplated such as an encoder or a decoder embodied as a special purpose processor.

For example, the method steps may be performed by an application-specific integrated circuit, or ASIC. For example, the ASIC may be configured as the encoder 205, the decoder 515, the controller 620 and/or the controller 720. Although the steps described below are described as being executed by a processor, the steps are not necessarily executed by a same processor. In other words, at least one processor may execute the steps described below with regard to FIGS. 8-11.

FIG. 8 illustrates a method for encoding data according to at least one example embodiment. As shown in FIG. 8, in step S805 geometric data to be encoded is received. For example, the geometric data can be game characters or virtual reality (VR) models, a scan having a large number of regular shaped triangles, a computer aided drawing (CAD) representing mechanical parts and/or the like. The geometric data can be received at a computing device including an encoder.

In step S810 at least one property associated with the geometric data is determined. The at least one property can include, for example, a number of vertices, edges, and/or triangles, a number of connected components for an attribute (e.g., vertex position, surface normal vector, and/or texture coordinates), a number of boundary edges for an attribute, a histogram of angles of triangle corners, a histogram of angles between triangles, a histogram of vertex valences and the like.

In step S815 a signature for the geometric data is generated based on the at least one property. The signature (e.g., signature 40) can be based on a statistical analysis of the at least one property of the geometric data. The signature can be unique for the geometric data. In other words, two different sets of geometric data should not generate the same signature.

In one implementation, a number of triangles and an angle associated with each of the vertices of the triangles can be determined. Then the angle data can be segmented. For example, a histogram can be defined based on the angle associated with each of the vertices of the triangles. Each bar of the histogram can be associated with an angle or range of angles. The signature can be based on the histogram. For example, the signature can have a length (e.g., number of variables) equal to the number of bars in the histogram. A unique signature for the geometric data can have a plurality of variable values corresponding to a value associated with each of the bars in the histogram.

In step S820 first options are enumerated. The first options can be associated with at least one of the fixed options and the environmental options described above. The first options can be an encoder input selected based on an encoding standard, selected using a default setting for an encoder, and/or selected based on system capabilities (e.g., processing, memory, available bandwidth, and/or the like). For example, the first options can include an encoding speed (e.g., a value between 1-10), a decoding speed (e.g., a value between 0-10), a number of quantization bits, and/or the like. In a first enumeration, variables associated with the first option can be set to a default value (e.g., all set to 0 or a minimum value). In subsequent enumerations, one of the variables associated with the first option can be incremented (e.g., changed from 0 to 1). When enumerating an option (e.g., the first option), note that the interplay of, for example, a number of quantization bits option and a bandwidth target option can determine an encoding performance. Accordingly, each enumerated option can include a unique combination of options including for example, the number of quantization bits option and the bandwidth target option.

In step S825 second options are enumerated. The second options can include options not included in the first options (or remaining options) as described above. The second option can change with different implementations of the encoder. The second option can include a number of quantization bits, vertex order, data prediction, and the like. In a first enumeration, variables associated with the second option can be set to a default value (e.g., all set to 0 or a minimum value). In subsequent enumerations, one of the variables associated with the second set of parameters can be incremented (e.g., changed from 0 to 1). When enumerating an option (e.g., the second option), note that the interplay of, for example, a traversal scheme option and a prediction scheme option can determine an encoding performance. Accordingly, each enumerated option can include a unique combination of options including for example, the traversal scheme option and the prediction scheme option.

In step S830 the geometric data is encoded using the first option and the second option. In an example implementation, the encoding module 135 can use an encoding technique that includes at least vertex ordering, data prediction and entropy coding. Vertex ordering can arrange the list of vertices into a certain structure so that the local relationship among vertices can be described. The vertex ordering can use variables associated with the second option as variable input. Data prediction can utilize the structure to produce a sequence of residuals by removing any redundancy in the geometric data. The data prediction can use variables associated with the second option as variable input. Entropy coding can include quantizing and coding the residuals based on a rate-distortion performance requirement. The entropy coding can use variables associated with the first option and the second option as variable input.

In step S835 results of a cost function are generated based on the encoding of the geometric data. In some implementations, the cost function can be based on minimizing an algorithm based on the first option. In an example implementation, the cost function can be based on minimizing an algorithm based on the environmental options 115-B. For example, the algorithm can be based on a fastest encode time (e.g., smallest elapsed time), fastest decode time (e.g., smallest elapsed time) and/or a size of the compressed data. These factors can be selected from the environmental options 115-B and weighted based on design preferences (e.g., the size of the compressed data can be more heavily weighted than decode time).

In step S840 whether or not enumeration of the second options is complete is determined. If enumeration of the second options is not complete, processing returns to step S825. If enumeration of the second options is complete, processing continues to step S845. Optimizing an encoding process can include determining a new second option for encoding the geometric data in a subsequent iteration. In other words, after encoding the geometric data, statistics based on the compression (e.g., encoding speed, compression rate, and the like) can be used to generate a cost function and/or be compared to threshold values based on, for example, the environmental options 115-B.

In step S845 the second option is selected based on the results of the cost function. For example, the second option corresponding to the cost function that meets a threshold condition can be selected as the second option. In an example implementation, the second option corresponding to the cost function that has the lowest value can be selected as the second option.

In step S850 a trained model is generated based on the selected second option, the first option and the signature. In an example implementation, a trained model includes a plurality of classifiers. Each classifier can include identifying information or data about the associated geometric data. For example, each classifier can include or be associated with a signature. Further, each classifier can include information related to encoding options. For example, each classifier can include the first option and the second option.

A classifier can be trained by associating a best or optimal second option (or second set of options) with a signature and first option (or first set of options). For example, a classifier can be generated to include the signature, the first option and the selected second option. The signature and first option can be used to access the classifier in the trained model and subsequently select the second option in a future encoding process. Generating the trained model can include initiating the trained model with the classifier, can include adding the trained classifier to an existing trained model and/or updating (e.g., changing the best or optimal second option) in a classifier that exists in the trained model.

In step S855 whether or not enumeration of the first options is complete is determined. If enumeration of the first options is not complete, processing returns to step S820. If enumeration of the first options is complete, processing ends. The process described with regard to FIG. 8 can be used to generate or train a model including a plurality of classifiers. The trained model can be stored and used in a subsequent or future encoding process. For example, the trained model can be stored in encoder 205 for use by the option selector 210.

Figure 9:
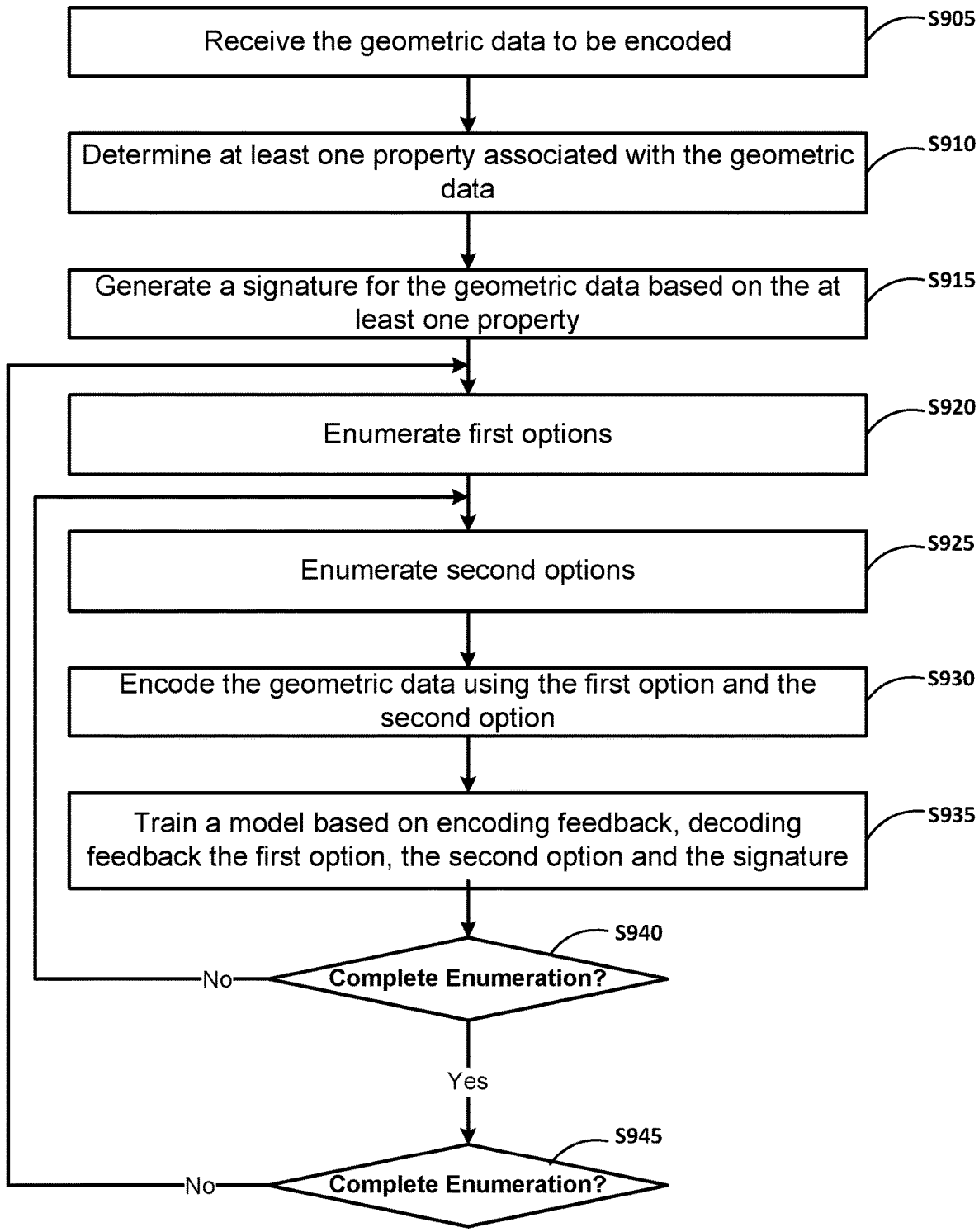
FIG. 9 illustrates a method for training a model according to at least one example embodiment.

FIG. 9 illustrates a method for training a model according to at least one example embodiment. As shown in FIG. 9, in step S905 geometric data to be encoded is received. For example, the geometric data can be game characters or virtual reality (VR) models, a scan having a large number of regular shaped triangles, a computer aided drawing (CAD) representing mechanical parts and/or the like. The geometric data can be received at a computing device including an encoder.

In step S910 at least one property associated with the geometric data is determined. The at least one property can include, for example, a number of vertices, edges, and/or triangles, a number of connected components for an attribute (e.g., normal, color, texture, vertex position, surface normal vector, and/or texture coordinates), a number of boundary edges for an attribute, a histogram of angles of triangle corners, a histogram of angles between triangles, a histogram of vertex valences and the like.

In step S915 a signature for the geometric data is generated based on the at least one property. The signature (e.g., signature 40) can be based on a statistical analysis of the at least one property of the geometric data. The signature can be unique for the geometric data. In other words, two different sets of geometric data should not generate the same signature.

In one implementation, a number of triangles and an angle associated with each of the vertices of the triangles can be determined. Then the angle data can be segmented. For example, a histogram can be defined based on the angle associated with each of the vertices of the triangles. Each bar of the histogram can be associated with an angle or range of angles. The signature can be based on the histogram. For example, the signature can have a length (e.g., number of variables) equal to the number of bars in the histogram. A unique signature for the geometric data can have a plurality of variable values corresponding to a value associated with each of the bars in the histogram.

In step S920 first options are enumerated. The first options can be associated with at least one of the fixed options and the environmental options described above. The first option can be an encoder input selected based on an encoding standard, selected using a default setting for an encoder, and/or selected based on system capabilities (e.g., processing, memory, available bandwidth, and/or the like). For example, the first option can include an encoding speed (e.g., a value between 1-10), a decoding speed (e.g., a value between 0-10), a number of quantization bits, and/or the like. In a first enumeration, variables associated with the first option can be set to a default value (e.g., all set to 0 or a minimum value). In subsequent enumerations, one of the variables associated with the first option can be incremented (e.g., changed from 0 to 1). When enumerating an option (e.g., the first option), note that the interplay of, for example, a number of quantization bits option and a bandwidth target option can determine an encoding performance. Accordingly, each enumerated option can include a unique combination of options including for example, the number of quantization bits option and the bandwidth target option.

In step S925 second options are enumerated. The second options can include options not included in the first options (or remaining options) as described above. The second option can change with different implementations of the encoder. The second option can include a number of quantization bits, vertex order, data prediction, and the like. In a first enumeration, variables associated with the second option can be set to a default value (e.g., all set to 0 or a minimum value). In subsequent enumerations, one of the variables associated with the second set of parameters can be incremented (e.g., changed from 0 to 1).

In step S930 the geometric data is encoded using the first option and the second option. In an example implementation, the encoding module 135 can use an encoding technique that includes at least vertex ordering, data prediction and entropy coding. Vertex ordering can arrange the list of vertices into a certain structure so that the local relationship among vertices can be described. The vertex ordering can use variables associated with the second option as variable input. Data prediction can utilize the structure to produce a sequence of residuals by removing any redundancy in the geometric data. The data prediction can use variables associated with the second option as variable input. Entropy coding can include quantizing and coding the residuals based on a rate-distortion performance requirement. The entropy coding can use variables associated with the first option and the second option as variable input.

In step S935 a model is trained based on encoding feedback, decoding feedback the first option and the signature. For example, the encoding feedback (e.g., feedback 25) can include data, statistics, training data, and the like associated with a performance of the compression of geometric data. The encoding feedback can include data, statistics, training data, and the like associated with a performance of the compression of geometric data. The decoding feedback (e.g., feedback 30) can include data, statistics, training data, and the like associated with a performance of the decompression of encoded data. In an example implementation, a trained model can include a plurality of regressors. Each regressor can include identifying information or data about the associated geometric data. For example, each regressor can include or be associated with a signature. Further, each regressor can include information or data related to encoding options. For example, each regressor can include the first option and/or the second option. Still further, each regressor can include information or data related to a performance of an encoding and/or decoding process for the associated geometric data.

A regressor can be trained by associating performance data with a signature a first option (or first set of options) and/or a second option (or set of options). For example, a regressor can be generated by combining the signature and the first option with the encoding feedback and the decoding feedback. Therefore, the regressor can include an encoding speed and a memory (e.g., cache and/or compressed data) usage associated with encoding the geometric data and a decoding speed and a memory usage associated with decoding the geometric data.

The combined signature and first option can be used to access the regressor. The regressor can provide the performance data (e.g., as a performance estimate or plurality of performance estimates) and the performance data can be used to select the second option in a future encoding process. Generating the trained model can include initiating the trained model with the trained regressor, can include adding the trained regressor to an existing trained model and/or updating (e.g., changing the performance data) in a regressor that exists in the trained model.

In step S940 whether or not enumeration of the second options is complete is determined. If enumeration of the second options is not complete, processing returns to step S925. If enumeration of the second options is complete, processing continues to step S945. In step S945 whether or not enumeration of the first options is complete is determined. If enumeration of the first options is not complete, processing returns to step S920. If enumeration of the first options is complete, processing ends.

FIG. 10 illustrates a method for encoding data according to at least one example embodiment. As shown in FIG. 10, in step S1005 geometric data to be encoded is received. For example, the geometric data can be game characters or virtual reality (VR) models, a scan having a large number of regular shaped triangles, a computer aided drawing (CAD) representing mechanical parts and/or the like. The geometric data can be received at a computing device including an encoder.

In step S1010 at least one property associated with the geometric data is determined. The at least one property can include, for example, a number of vertices, edges, and/or triangles, a number of connected components for an attribute (e.g., normal, color, texture, vertex position, surface normal vector, and/or texture coordinates), a number of boundary edges for an attribute, a histogram of angles of triangle corners, a histogram of angles between triangles, a histogram of vertex valences and the like.

In step S1015 a signature for the geometric data is generated based on the at least one property. The signature (e.g., signature 40) can be based on a statistical analysis of the at least one property of the geometric data. The signature can be unique for the geometric data. In other words, two different sets of geometric data should not generate the same signature.

In one implementation, a number of triangles and an angle associated with each of the vertices of the triangles can be determined. Then the angle data can be segmented. For example, a histogram can be defined based on the angle associated with each of the vertices of the triangles. Each bar of the histogram can be associated with an angle or range of angles. The signature can be based on the histogram. For example, the signature can have a length (e.g., number of variables) equal to the number of bars in the histogram. A unique signature for the geometric data can have a plurality of variable values corresponding to a value associated with each of the bars in the histogram.

In step S1020 a first option is received. The first option can be an encoder input selected based on an encoding standard, selected using by a user, as an encoding standard setting, and/or selected based on system capabilities (e.g., processing, memory, available bandwidth, and/or the like). For example, the first option can include an encoding speed (e.g., a value between 1-10), a decoding speed (e.g., a value between 0-10), a number of quantization bits, and/or the like.

In step S1025 a second option is selected based on the signature and the first option. The second option can be selected from a trained model as generated using the process described in FIG. 8. In an example implementation, a classifier can be accessed based on the signature and the first option (or first set of options) and a second option (or set of second options) can be selected based on the classifier. Accessing the classifier can include using a trained machine learning model based on one of a random forest model, a neural network model and a cluster analysis model to search for the classifier amongst the plurality of classifiers included in the trained model.

In some implementations, the second option (or set of second options) associated with the classifier can be a reference or pointer to the second option. The reference or pointer can be used (e.g., as a key or index) to select the second option (or set of second options) from a storage location (e.g., a table, a file, an XML file, a remote storage location and the like).

In step S1030 the geometric data is encoded using the first option and the second option. In an example implementation, the encoding module 135 can use an encoding technique that includes at least vertex ordering, data prediction and entropy coding. Vertex ordering can arrange the list of vertices into a certain structure so that the local relationship among vertices can be described. The vertex ordering can use the second option as variable input. Data prediction can utilize the structure to produce a sequence of residuals by removing any redundancy in the geometric data. The data prediction can use the second option as variable input. Entropy coding can include quantizing and coding the residuals based on a rate-distortion performance requirement. The entropy coding can use the first option and the second option as variable input.

In an example implementation, the encoded geometric data can be stored. The stored geometric data can later be recalled and transmitted for future display (e.g., decoded and rendered by a computer system including a display. In an example implementation, the encoded geometric data can be transmitted for display (e.g., decoded and rendered by a computer system including a display.

FIG. 11 illustrates another method for encoding data according to at least one example embodiment. As shown in FIG. 11, in step geometric data to be encoded is received. For example, the geometric data can be game characters or virtual reality (VR) models, a scan having a large number of regular shaped triangles, a computer aided drawing (CAD) representing mechanical parts and/or the like. The geometric data can be received at a computing device including an encoder.

In step S1110 at least one property associated with the geometric data is determined. The at least one property can include, for example, a number of vertices, edges, and/or triangles, a number of connected components for an attribute (e.g., normal, color, texture, vertex position, surface normal vector, and/or texture coordinates), a number of boundary edges for an attribute, a histogram of angles of triangle corners, a histogram of angles between triangles, a histogram of vertex valences and the like.

In step S1115 a signature for the geometric data is generated based on the at least one property. The signature (e.g., signature 40) can be based on a statistical analysis of the at least one property of the geometric data. The signature can be unique for the geometric data. In other words, two different sets of geometric data should not generate the same signature.

In one implementation, a number of triangles and an angle associated with each of the vertices of the triangles can be determined. Then the angle data can be segmented. For example, a histogram can be defined based on the angle associated with each of the vertices of the triangles. Each bar of the histogram can be associated with an angle or range of angles. The signature can be based on the histogram. For example, the signature can have a length (e.g., number of variables) equal to the number of bars in the histogram. A unique signature for the geometric data can have a plurality of variable values corresponding to a value associated with each of the bars in the histogram.

In step S1120 a first option is received. The first option can be an encoder input selected based on an encoding standard, selected using by a user, as an encoding standard setting, and/or selected based on system capabilities (e.g., processing, memory, available bandwidth, and/or the like). For example, the first option can include an encoding speed (e.g., a value between 1-10), a decoding speed (e.g., a value between 0-10), a number of quantization bits, and/or the like.

In step S1125 second options are enumerated. The second options can include options not included in the first options (or remaining options) as described above. The second option can change with different implementations of the encoder. The second option can include a number of quantization bits, vertex order, data prediction, and the like. In a first enumeration, variables associated with the second option can be set to a default value (e.g., all set to 0 or a minimum value). In subsequent enumerations, one of the variables associated with the second set of parameters can be incremented (e.g., changed from 0 to 1). When enumerating an option (e.g., the second option), note that the interplay of, for example, a traversal scheme option and a prediction scheme option can determine an encoding performance. Accordingly, each enumerated option can include a unique combination of options including for example, the traversal scheme option and the prediction scheme option.

In step S1130 whether or not enumeration of the second options is complete is determined. If enumeration of the second options is not complete, processing returns to step S1125. If enumeration of the second options is complete, processing continues to step S1135.

In step S1135 a second option is selected using the enumerated options. In some implementations, a regressor can be accessed based on the signature and the first option (or first set of options) and a second option (or set of second options) can be selected based on the regressor. Accessing the regressor can include using a trained machine learning model based on one of a random forest model, a neural network model and a cluster analysis model to search for the regressor amongst the plurality of regressor included in the trained model.

In an example implementation, the regressor includes a plurality of performance estimates and the second option can be selected from the enumerated second options (or second set of options) based on the plurality of performance estimates and a cost function. For example, the second option can be selected based on at least one performance estimate associated with a regressor, an environmental option associated with the encoding device and a cost function. In an example implementation, the cost function can include an algorithm that weighs bandwidth (or compressed memory usage) over encoder speed and decoder speed. In other words, minimizing the bandwidth usage can be more important than how fast geometric data is encoded or decoded. Accordingly, the cost function can include a variable including a compression rate that is selected from the performance estimates. The cost function can further include a variable including the encoder speed and a variable including a decoder speed each selected from the performance estimates and the environmental option (e.g., the performance estimate can be modified based on the environment because the trained model can be generated in a different environment than encoding device). The second option can be the second option having the lowest corresponding cost function.

In an example implementation, the cost function can include an algorithm that weighs encoding time over bandwidth usage. In other words, minimizing the time to compress the geometric data can be more important than how bandwidth usage or the time to decode compressed data. Accordingly, the cost function can include at least one variable associated with compression speed. For example, the at least one variable can include a performance estimate associated with a trained model, an amount of cache available for the encoding device and a processor speed associated with the encoding device each selected from the environmental option. The cost function can further include a variable including a compression rate that is selected from the performance estimates and a variable including a decoder speed selected from the performance estimate and/or the environmental option (e.g., the performance estimate can be modified based on the environment because the trained model can be generated in a different environment than encoding device). The second option can be the second option having the lowest corresponding cost function. The cost functions described above are exemplary. The disclosure is not limited thereto.

In some implementations, a second option (or set of second options) selected using the regressor can be a reference or pointer to the second option. The reference or pointer can be used (e.g., as a key or index) to select the second option (or set of second options) from a storage location (e.g., a table, a file, an XML file, a remote storage location and the like).

In step S1140 the geometric data is encoded using the first option and the second option. In an example implementation, the encoding module 135 can use an encoding technique that includes at least vertex ordering, data prediction and entropy coding. Vertex ordering can arrange the list of vertices into a certain structure so that the local relationship among vertices can be described. The vertex ordering can use the second option as variable input. Data prediction can utilize the structure to produce a sequence of residuals by removing any redundancy in the geometric data. The data prediction can use the second option as variable input. Entropy coding can include quantizing and coding the residuals based on a rate-distortion performance requirement. The entropy coding can use the first option and the second option as variable input.

In an example implementation, the encoded geometric data can be stored. The stored geometric data can later be recalled and transmitted for future display (e.g., decoded and rendered by a computer system including a display. In an example implementation, the encoded geometric data can be transmitted for display (e.g., decoded and rendered by a computer system including a display.

Figure 12:
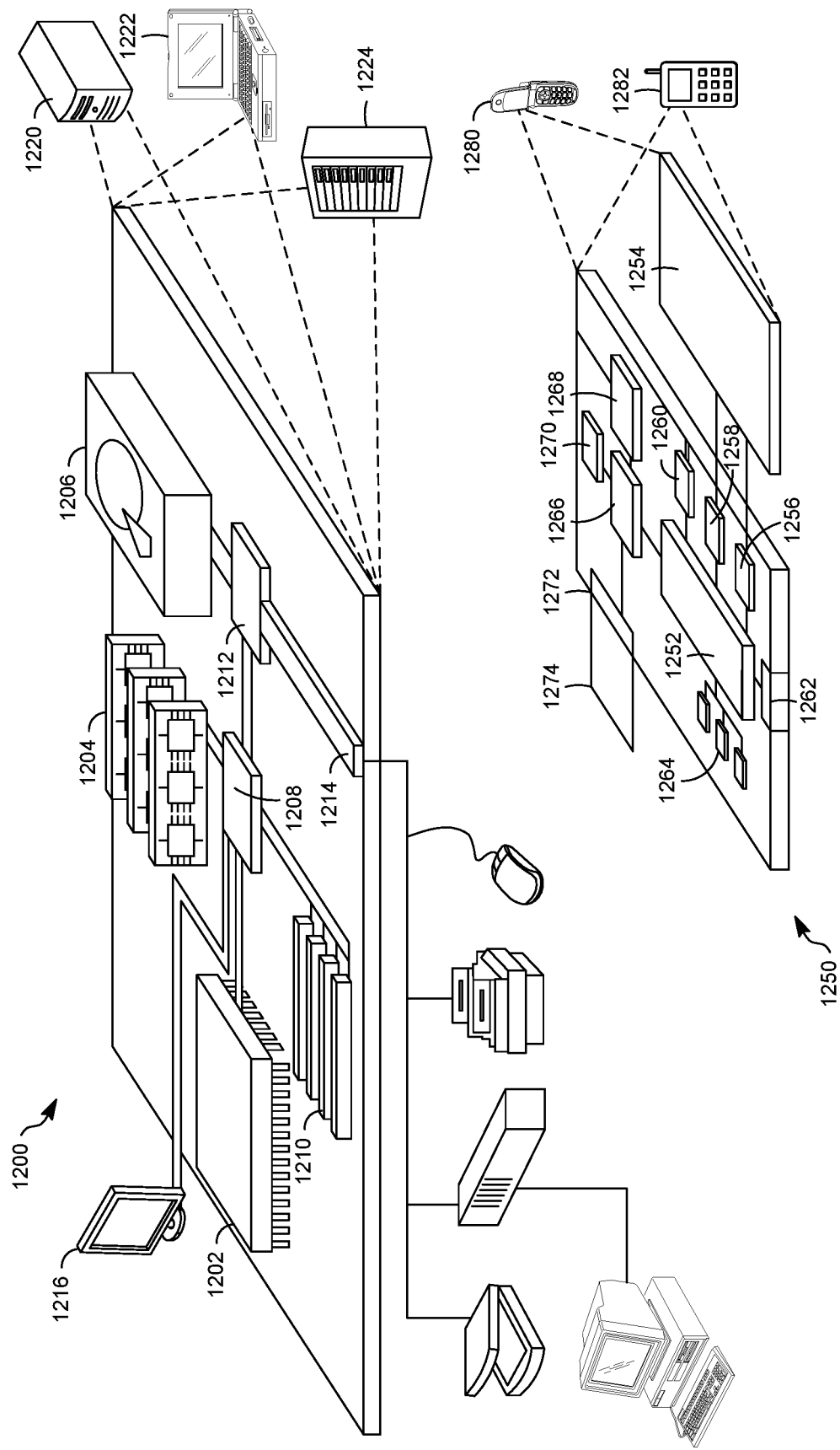
FIG. 12 shows an example of a computer device and a mobile computer device according to at least one example embodiment.

FIG. 12 shows an example of a computer device 1200 and a mobile computer device 1250, which may be used with the techniques described here. Computing device 1200 is intended to represent various forms of digital computers, such as laptops, desktops, workstations, personal digital assistants, servers, blade servers, mainframes, and other appropriate computers. Computing device 1250 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1200 includes a processor 1202, memory 1204, a storage device 1206, a high-speed interface 1208 connecting to memory 1204 and high-speed expansion ports 1210, and a low speed interface 1212 connecting to low speed bus 1214 and storage device 1206. Each of the components 1202, 1204, 1206, 1208, 1210, and 1212, are interconnected using various busses, and may be mounted on a common motherboard or in other manners as appropriate. The processor 1202 can process instructions for execution within the computing device 1200, including instructions stored in the memory 1204 or on the storage device 1206 to display graphical information for a GUI on an external input/output device, such as display 1216 coupled to high speed interface 1208. In other implementations, multiple processors and/or multiple buses may be used, as appropriate, along with multiple memories and types of memory. Also, multiple computing devices 1200 may be connected, with each device providing portions of the necessary operations (e.g., as a server bank, a group of blade servers, or a multi-processor system).

The memory 1204 stores information within the computing device 1200. In one implementation, the memory 1204 is a volatile memory unit or units. In another implementation, the memory 1204 is a non-volatile memory unit or units. The memory 1204 may also be another form of computer-readable medium, such as a magnetic or optical disk.

The storage device 1206 is capable of providing mass storage for the computing device 1200. In one implementation, the storage device 1206 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1204, the storage device 1206, or memory on processor 1202.

The high speed controller 1208 manages bandwidth-intensive operations for the computing device 1200, while the low speed controller 1212 manages lower bandwidth-intensive operations. Such allocation of functions is exemplary only. In one implementation, the high-speed controller 1208 is coupled to memory 1204, display 1216 (e.g., through a graphics processor or accelerator), and to high-speed expansion ports 1210, which may accept various expansion cards (not shown). In the implementation, low-speed controller 1212 is coupled to storage device 1206 and low-speed expansion port 1214. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1200 may be implemented in a number of different forms, as shown in the figure. For example, it may be implemented as a standard server 1220, or multiple times in a group of such servers. It may also be implemented as part of a rack server system 1224. In addition, it may be implemented in a personal computer such as a laptop computer 1222. Alternatively, components from computing device 1200 may be combined with other components in a mobile device (not shown), such as device 1250. Each of such devices may contain one or more of computing device 1200, 1250, and an entire system may be made up of multiple computing devices 1200, 1250 communicating with each other.

Computing device 1250 includes a processor 1252, memory 1264, an input/output device such as a display 1254, a communication interface 1266, and a transceiver 1268, among other components. The device 1250 may also be provided with a storage device, such as a microdrive or other device, to provide additional storage. Each of the components 1250, 1252, 1264, 1254, 1266, and 1268, are interconnected using various buses, and several of the components may be mounted on a common motherboard or in other manners as appropriate.

The processor 1252 can execute instructions within the computing device 1250, including instructions stored in the memory 1264. The processor may be implemented as a chipset of chips that include separate and multiple analog and digital processors. The processor may provide, for example, for coordination of the other components of the device 1250, such as control of user interfaces, applications run by device 1250, and wireless communication by device 1250.

Processor 1252 may communicate with a user through control interface 1258 and display interface 1256 coupled to a display 1254. The display 1254 may be, for example, a TFT LCD (Thin-Film-Transistor Liquid Crystal Display) or an OLED (Organic Light Emitting Diode) display, or other appropriate display technology. The display interface 1256 may comprise appropriate circuitry for driving the display 1254 to present graphical and other information to a user. The control interface 1258 may receive commands from a user and convert them for submission to the processor 1252. In addition, an external interface 1262 may be provide in communication with processor 1252, to enable near area communication of device 1250 with other devices. External interface 1262 may provide, for example, for wired communication in some implementations, or for wireless communication in other implementations, and multiple interfaces may also be used.

The memory 1264 stores information within the computing device 1250. The memory 1264 can be implemented as one or more of a computer-readable medium or media, a volatile memory unit or units, or a non-volatile memory unit or units. Expansion memory 1274 may also be provided and connected to device 1250 through expansion interface 1272, which may include, for example, a SIMM (Single In Line Memory Module) card interface. Such expansion memory 1274 may provide extra storage space for device 1250, or may also store applications or other information for device 1250. Specifically, expansion memory 1274 may include instructions to carry out or supplement the processes described above, and may include secure information also. Thus, for example, expansion memory 1274 may be provide as a security module for device 1250, and may be programmed with instructions that permit secure use of device 1250. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1264, expansion memory 1274, or memory on processor 1252, that may be received, for example, over transceiver 1268 or external interface 1262.

Device 1250 may communicate wirelessly through communication interface 1266, which may include digital signal processing circuitry where necessary. Communication interface 1266 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1268. In addition, short-range communication may occur, such as using a Bluetooth, Wi-Fi, or other such transceiver (not shown). In addition, GPS (Global Positioning System) receiver module 1270 may provide additional navigation- and location-related wireless data to device 1250, which may be used as appropriate by applications running on device 1250.

Device 1250 may also communicate audibly using audio codec 1260, which may receive spoken information from a user and convert it to usable digital information. Audio codec 1260 may likewise generate audible sound for a user, such as through a speaker, e.g., in a handset of device 1250. Such sound may include sound from voice telephone calls, may include recorded sound (e.g., voice messages, music files, etc.) and may also include sound generated by applications operating on device 1250.

The computing device 1250 may be implemented in a number of different forms, as shown in the figure. For example, it may be implemented as a cellular telephone 1280. It may also be implemented as part of a smart phone 1282, personal digital assistant, or other similar mobile device.

While example embodiments may include various modifications and alternative forms, embodiments thereof are shown by way of example in the drawings and have been described in detail. It should be understood, however, that there is no intent to limit example embodiments to the particular forms disclosed, but on the contrary, example embodiments are to cover all modifications, equivalents, and alternatives falling within the scope of the claims.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. Various implementations of the systems and techniques described here can be realized as and/or generally be referred to herein as a circuit, a module, a block, or a system that can combine software and hardware aspects. For example, a module may include the functions/acts/computer program instructions executing on a processor (e.g., a processor formed on a silicon substrate, a GaAs substrate, and the like) or some other programmable data processing apparatus.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term and/or includes any and all combinations of one or more of the associated listed items.

It will be understood that when an element is referred to as being connected or coupled to another element, it can be directly connected or coupled to the other element or intervening elements may be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular embodiments only and is not intended to be limiting of example embodiments. As used herein, the singular forms a, an and the are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of non-transitory program storage medium or implemented over some type of transmission medium. The program storage medium may be magnetic (e.g., a floppy disk or a hard drive) or optical (e.g., a compact disk read only memory, or CD ROM), and may be read only or random access. Similarly, the transmission medium may be twisted wire pairs, coaxial cable, optical fiber, or some other suitable transmission medium known to the art. The example embodiments not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A method comprising:
receiving geometric data to be encoded;
generating a signature for the geometric data based on at least one property associated with the geometric data, the signature being represented by a number of variables based on a statistical analysis of the at least one property;
changing at least one variable value for a first set of parameters associated with compressing the geometric data to define a first set of options;
changing at least one variable value for a second set of parameters associated with compressing the geometric data to define a set of second options;
encoding the geometric data using the first set of options and the set of second options;
decoding the encoded geometric data;
selecting one of the set of second options based on a cost function, the cost function being based on a feedback from at least one of a compression of the geometric data or a decompression of the geometric data; and
training a classifier based on the signature, the first set of options and the selected second option.

2. The method of claim 1, wherein
the geometric data is mesh data,
the at least one property includes at least one of a number of vertices, a number of edges, and a number of triangles, and
the signature is based on the number of vertices, the number of edges, and the number of triangles in the mesh data.

3. The method of claim 1, wherein
the geometric data is mesh data,
the at least one property includes a number of connected components for at least one attribute, and
the signature is based on the number of connected components for the at least one attribute in the mesh data.

4. The method of claim 1, wherein
the geometric data is mesh data,
the at least one property includes a number of boundary edges for at least one attribute, and
the signature is based on the number of boundary edges for the at least one attribute in the mesh data.

5. The method of claim 1, wherein
the geometric data is mesh data,
the at least one property includes an angle of a triangles corner, and
the signature is based on a statistical analysis of a histogram of the angles of triangle corners in the mesh data.

6. The method of claim 1, wherein
the geometric data is mesh data,
the at least one property includes angles between triangles, and
the signature is based on a statistical analysis of a histogram of the angles between triangles in the mesh data.

7. The method of claim 1, wherein
the geometric data is mesh data,
the at least one property includes vertex valences, and
the signature is based on a statistical analysis of a histogram of the vertex valences in the mesh data.

8. The method of claim 1, wherein the first set of options includes a fixed option and an environmental option.

9. The method of claim 1, wherein the cost function is based on a performance associated with encoding the geometric data and a performance associated with decoding the encoded geometric data.

10. The method of claim 1, wherein
the statistical analysis of the at least one property includes a histogram including a plurality of numerical ranges, and
at least a portion of the number of variables correspond to the plurality of numeric ranges.

11. A method comprising:
receiving geometric data to be encoded;
generating a signature for the geometric data based on at least one property associated with the geometric data, the signature being represented by a number of variables based on a statistical analysis of the at least one property;
receiving a first set of options defined by a first set of parameters associated with compressing the geometric data;
accessing a classifier based on the signature and the first set of options;
selecting a set of second options based on the classifier, the set of second options being defined by a second set of parameters associated with compressing the geometric data; and
encoding the geometric data using the first set of options and the set of second options.

12. The method of claim 11, wherein
the geometric data is mesh data,
the signature is based on at least one of a number of vertices, a number of edges, and a number of triangles in the mesh data, and
accessing the classifier uses a trained machine learning model based on one of a random forest model, a neural network model and a cluster analysis model.

13. The method of claim 11, wherein
the geometric data is mesh data,
the signature is based on a number of connected components for at least one attribute in the mesh data, and
accessing the classifier uses a trained machine learning model based on one of a random forest model, a neural network model and a cluster analysis model.

14. The method of claim 11, wherein
the geometric data is mesh data, the signature is based on a number of boundary edges for at least one attribute in the mesh data, and accessing the classifier uses a trained machine learning model based on one of a random forest model, a neural network model and a cluster analysis model.

15. The method of claim 11, wherein the geometric data is mesh data, the signature is based on a histogram of an angle of a triangles corner in the mesh data, and accessing the classifier uses a trained machine learning model based on one of a random forest model, a neural network model and a cluster analysis model.

16. The method of claim 11, wherein the geometric data is mesh data, the signature is based on a histogram of angles between triangles in the mesh data, and accessing the classifier uses a trained machine learning model based on one of a random forest model, a neural network model and a cluster analysis model.

17. The method of claim 11, wherein the geometric data is mesh data, the signature is based on a histogram of vertex valences in the mesh data, and accessing the classifier uses a trained machine learning model based on one of a random forest model, a neural network model and a cluster analysis model.

18. The method of claim 11, wherein the first set of options include a fixed option and an environmental option.

19. The method of claim 11, wherein the first set of options include a fixed option and an environmental option, the selecting of the second option is based on the fixed option and the environmental option, and the encoding of the geometric data uses the fixed option.

20. A non-transitory computer-readable storage medium having stored thereon computer executable program code which, when executed on a computer system, causes the computer system to perform steps comprising:

receiving geometric data to be encoded;

generating a signature for the geometric data based on at least one property associated with the geometric data, the signature being represented by a number of variables based on a statistical analysis of the at least one property;

receiving a first set of options defined by a first set of parameters associated with compressing the geometric data;

accessing a classifier based on the signature and the first set of options;

selecting a set of second options based on the classifier, the set of second options being defined by a second set of parameters associated with compressing the geometric data; and encoding the geometric data using the first set of options and the set of second options.

\* \* \* \* \*